United States Patent [19]
Fielder

[11] Patent Number: 6,124,895
[45] Date of Patent: Sep. 26, 2000

[54] FRAME-BASED AUDIO CODING WITH VIDEO/AUDIO DATA SYNCHRONIZATION BY DYNAMIC AUDIO FRAME ALIGNMENT

[75] Inventor: Louis Dunn Fielder, Millbrae, Calif.

[73] Assignee: Dolby Laboratories Licensing Corporation, San Francisco, Calif.

[21] Appl. No.: 08/953,618

[22] Filed: Oct. 17, 1997

[51] Int. Cl.$^7$ ................................................. H04N 9/475
[52] U.S. Cl. ........................................ 348/515; 348/845.3
[58] Field of Search ..................................... 348/515, 513, 348/512, 461, 462, 463, 467, 423, 845, 845.3; 704/260; H04N 9/475

[56] References Cited

U.S. PATENT DOCUMENTS

| | | | |
|---|---|---|---|
| 4,903,148 | 2/1990 | Amano et al. . | |
| 4,963,967 | 10/1990 | Orland et al. | 348/515 |
| 5,351,092 | 9/1994 | Poimboeuf et al. . | |
| 5,463,425 | 10/1995 | Tachi | 348/515 |
| 5,483,538 | 1/1996 | Rainbolt . | |
| 5,603,016 | 2/1997 | Davies | 348/515 |
| 5,717,815 | 2/1998 | Nakano et al. . | |

FOREIGN PATENT DOCUMENTS

| | | |
|---|---|---|
| 0158055 | 2/1985 | European Pat. Off. . |
| 0829875 | 3/1998 | European Pat. Off. . |
| 2311918 | 10/1997 | United Kingdom . |

OTHER PUBLICATIONS

"Design of Window Functions for Transform Coding Using time Domain Aliasing Cancellation," by Gerhard Dickopp and Thomas Vaupen, Archiv fur Elecktronik und Ubertragungstechnnik, vol. 50, No. 1, Jan. 1, 1996, pp. 32–40.

Patent Abstracts of Japan, vol. 010, No. 074 (P–439), Mar. 25, 1986 & JP 60 212874 A (Matsushita Denki Sangyo KK), Oct. 25, 1985.

*Primary Examiner*—Michael H. Lee
*Attorney, Agent, or Firm*—Gallagher & Lathrop; David N. Lathrop

[57] ABSTRACT

Several audio signal processing techniques may be used in various combinations to improve the quality of audio represented by an information stream formed by splice editing two or more other information streams. The techniques are particularly useful in applications that bundle audio information with video information. In one technique, gain-control words conveyed with the audio information stream are used to interpolate playback sound levels across a splice. In another technique, special filterbanks or forms of TDAC transforms are used to suppress aliasing artifacts on either side of a splice. In yet another technique, special filterbanks or crossfade window functions are used to optimize the attenuation of spectral splatter created at a splice. In a further technique, audio sample rates are converted according to frame lengths and rates to allow audio information to be bundled with, for example, video information. In yet a further technique, audio blocks are dynamically aligned so that proper synchronization can be maintained across a splice. An example for 48 kHz audio with NTSC video is discussed.

16 Claims, 10 Drawing Sheets

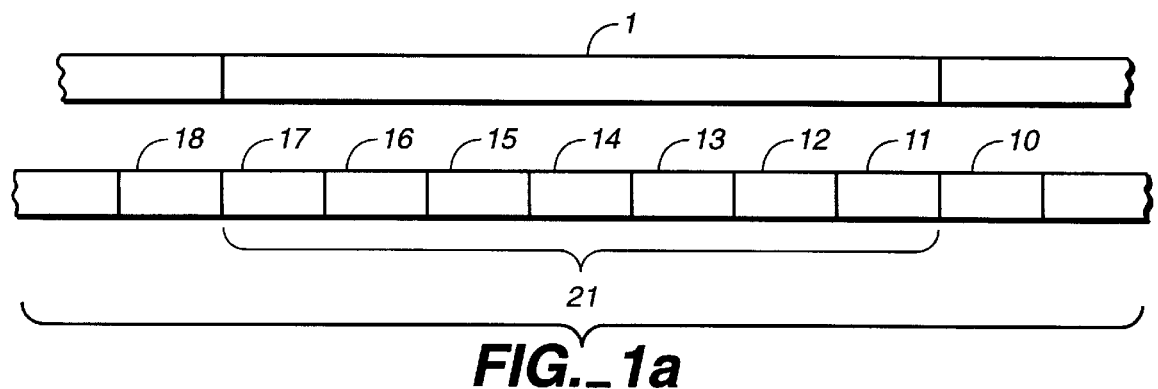
FIG._1a
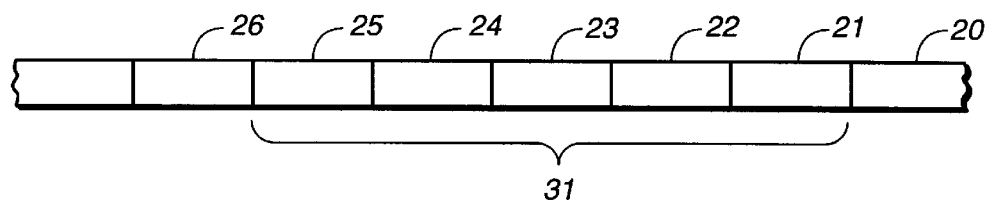
FIG._1b
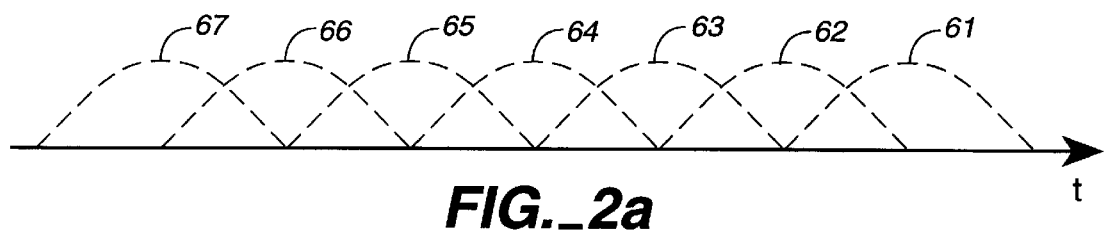
FIG._2a
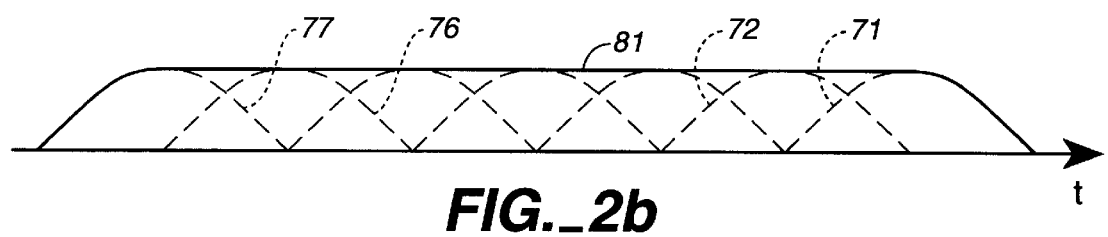
FIG._2b
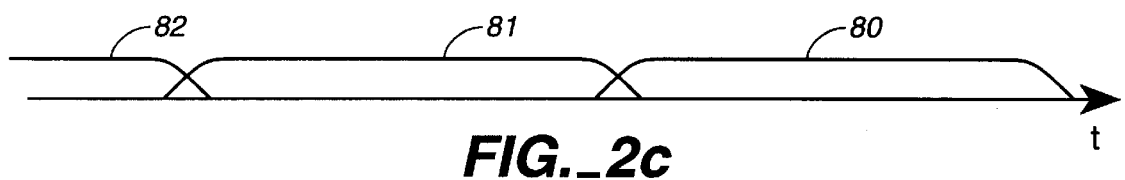
FIG._2c

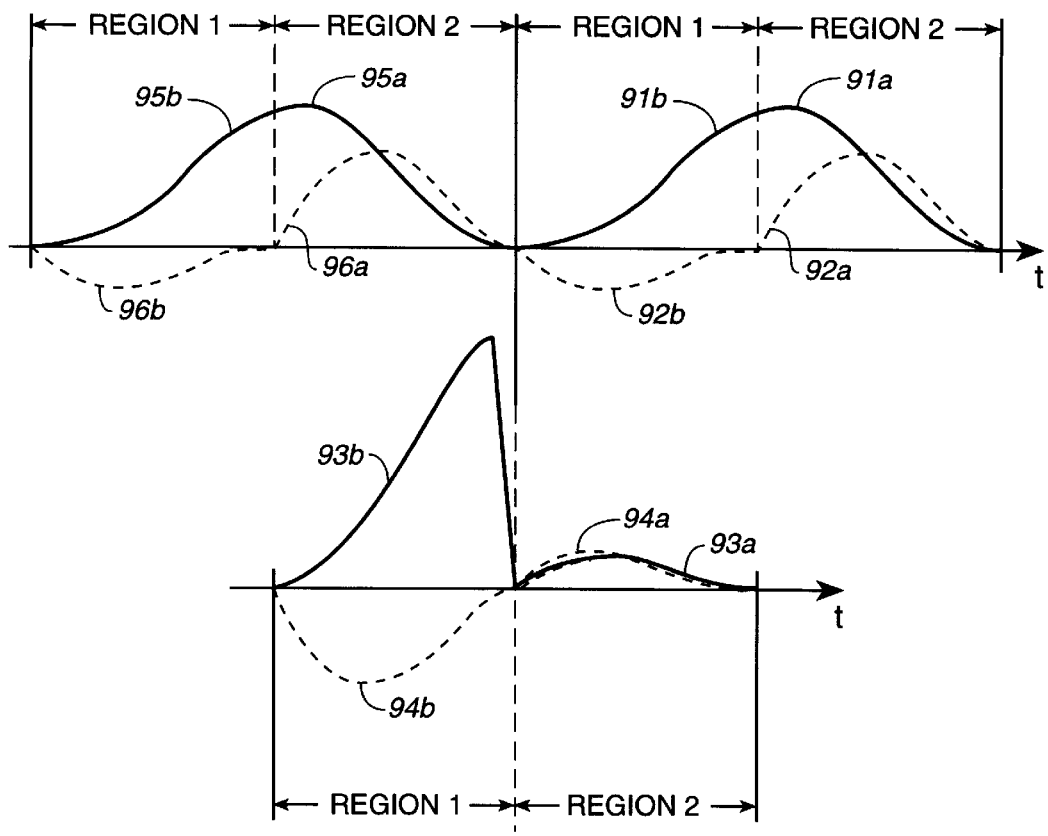
FIG._3
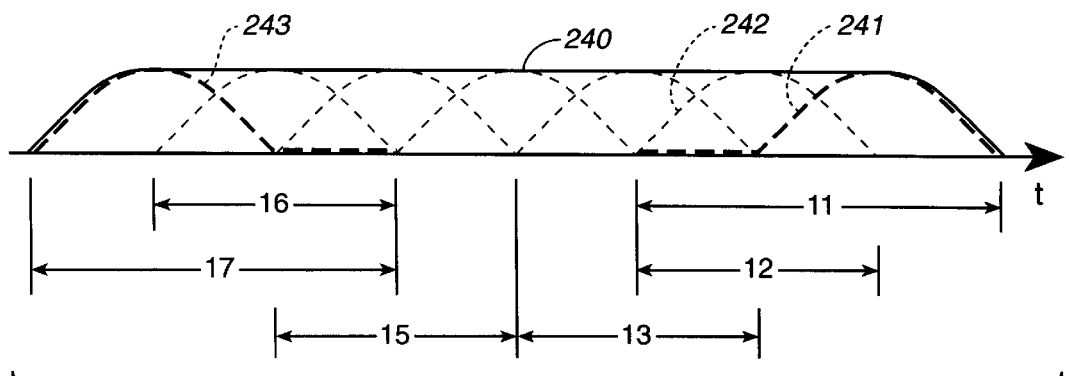
FIG._6d

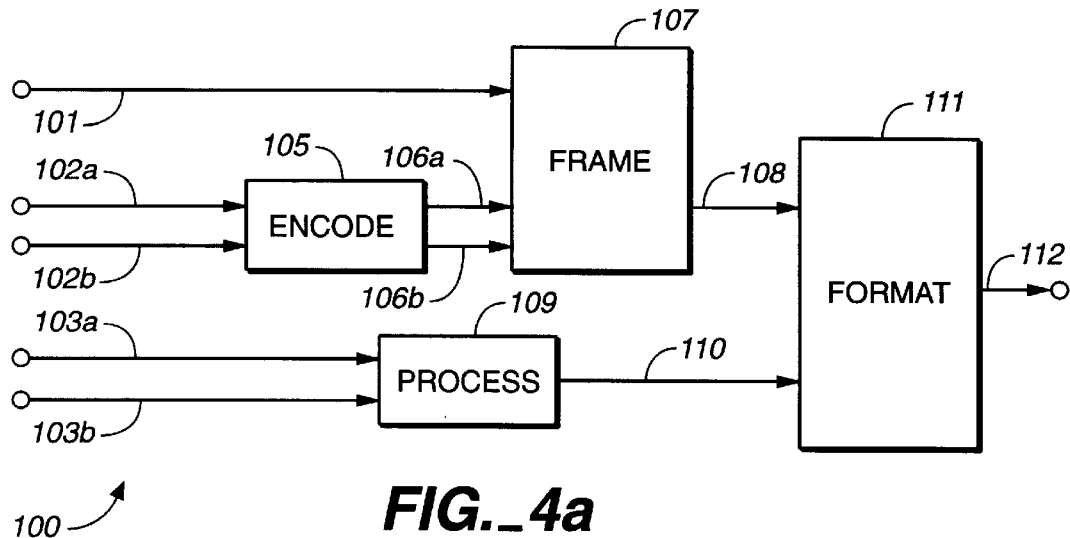
FIG._4a
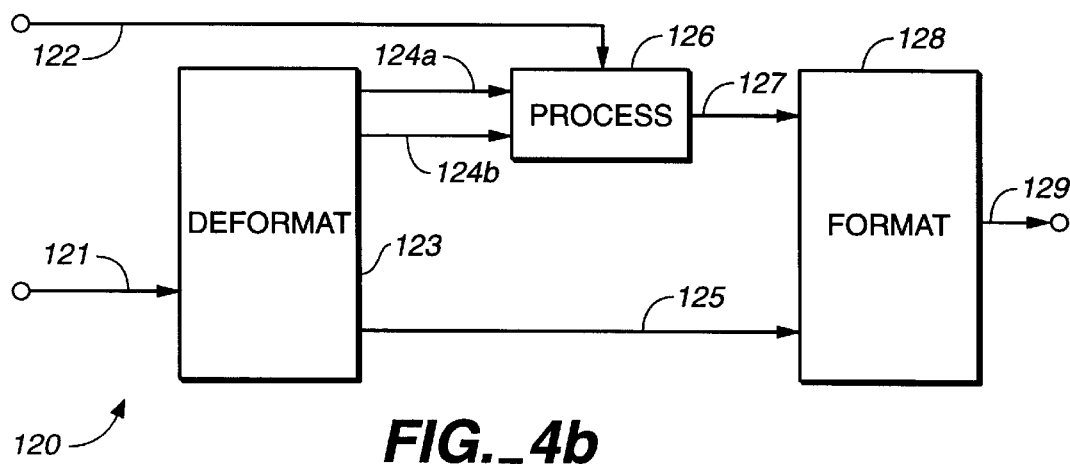
FIG._4b
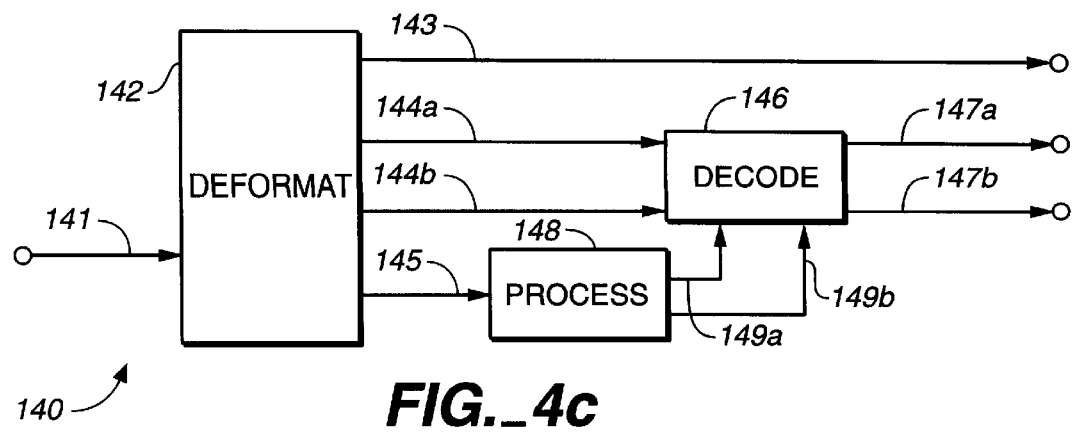
FIG._4c

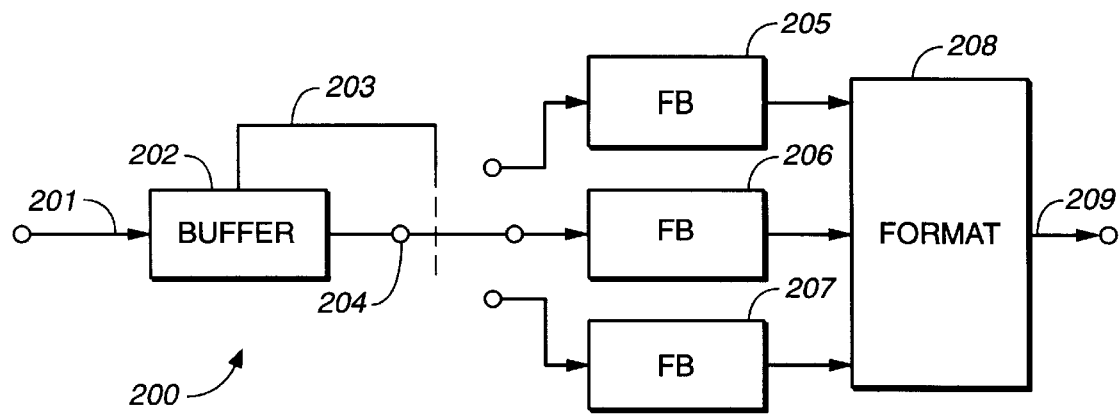
FIG._5a
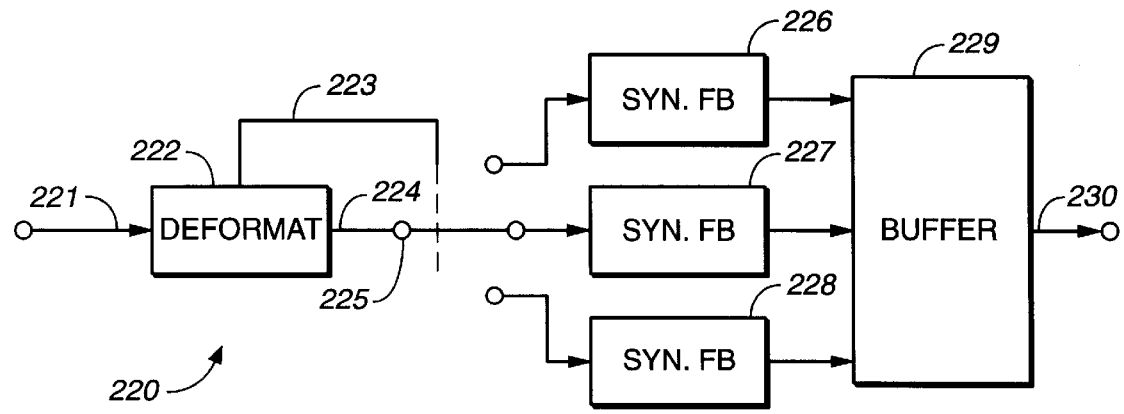
FIG._5b
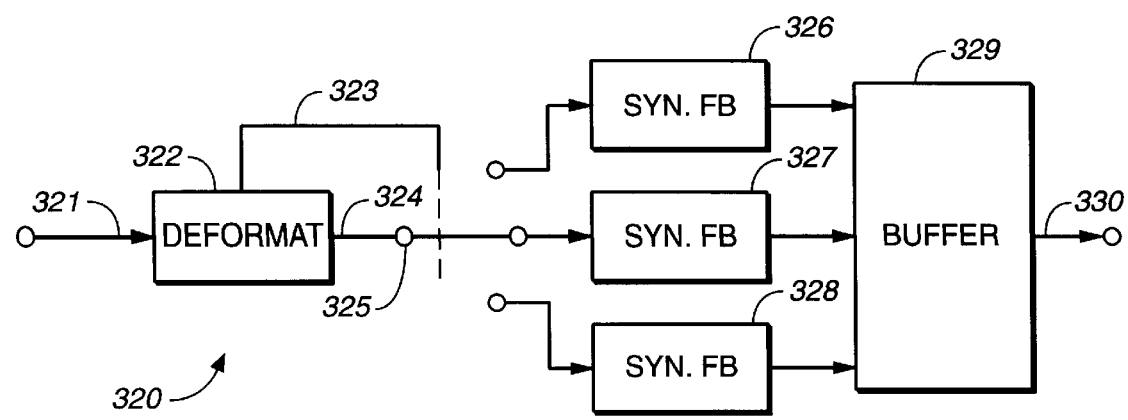
FIG._8

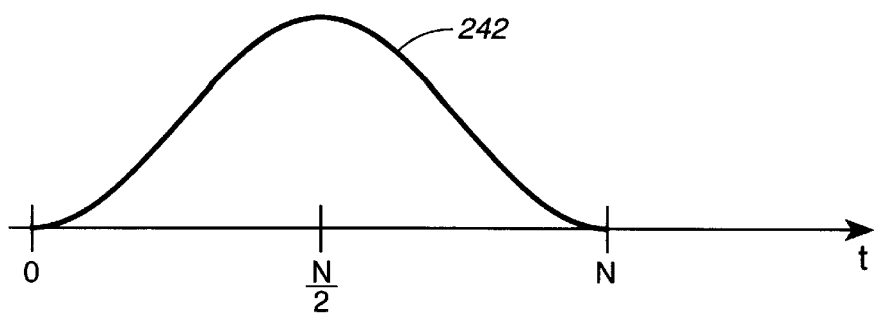
FIG._6a
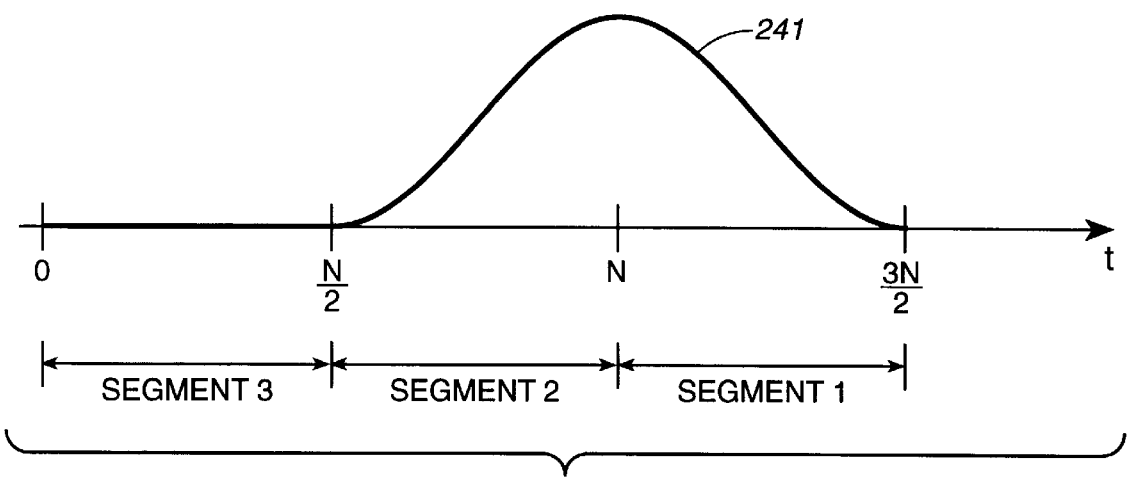
FIG._6b
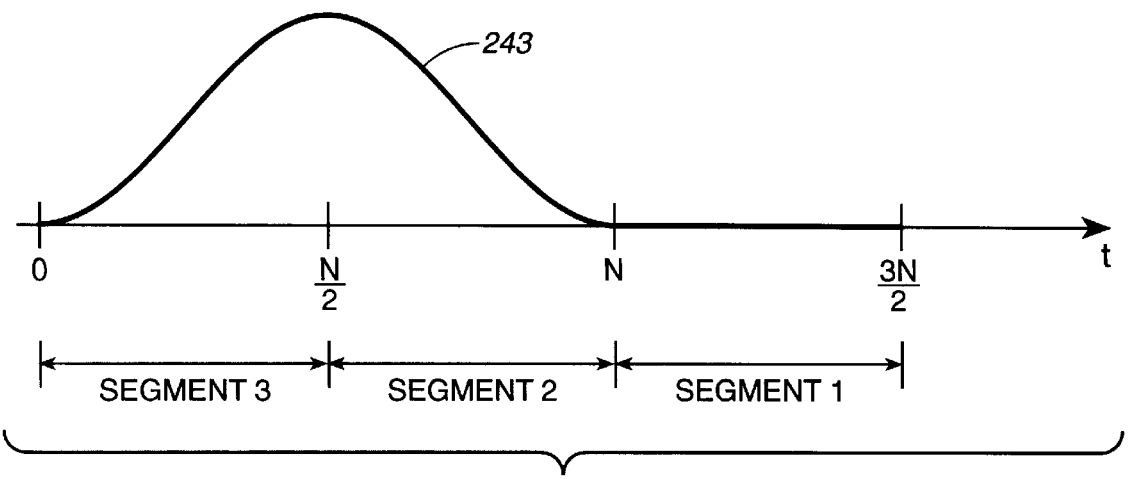
FIG._6c

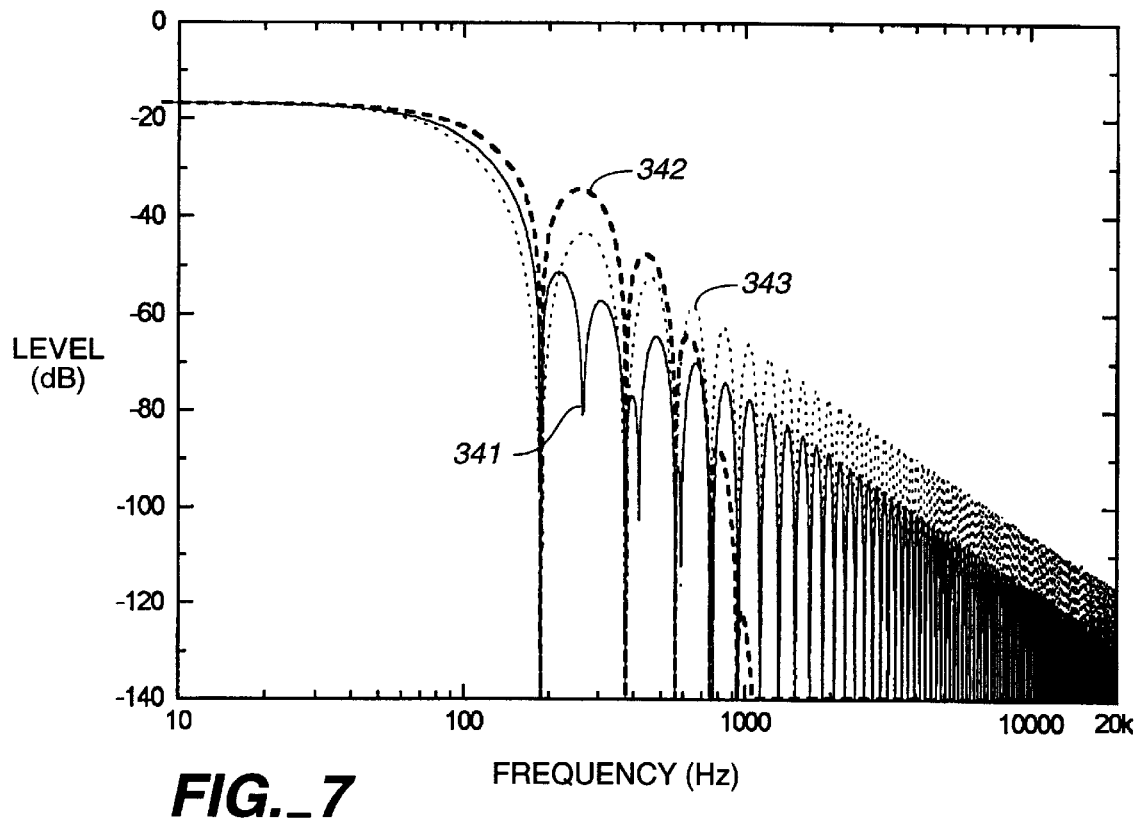
FIG._7
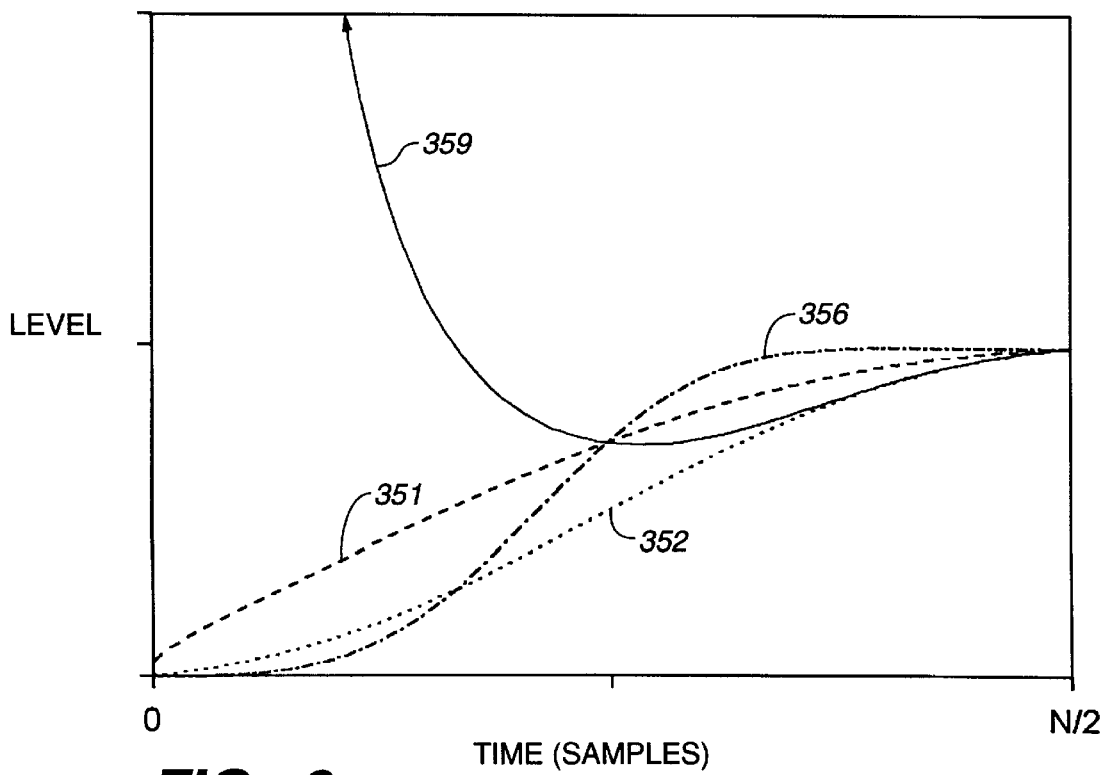
FIG._9

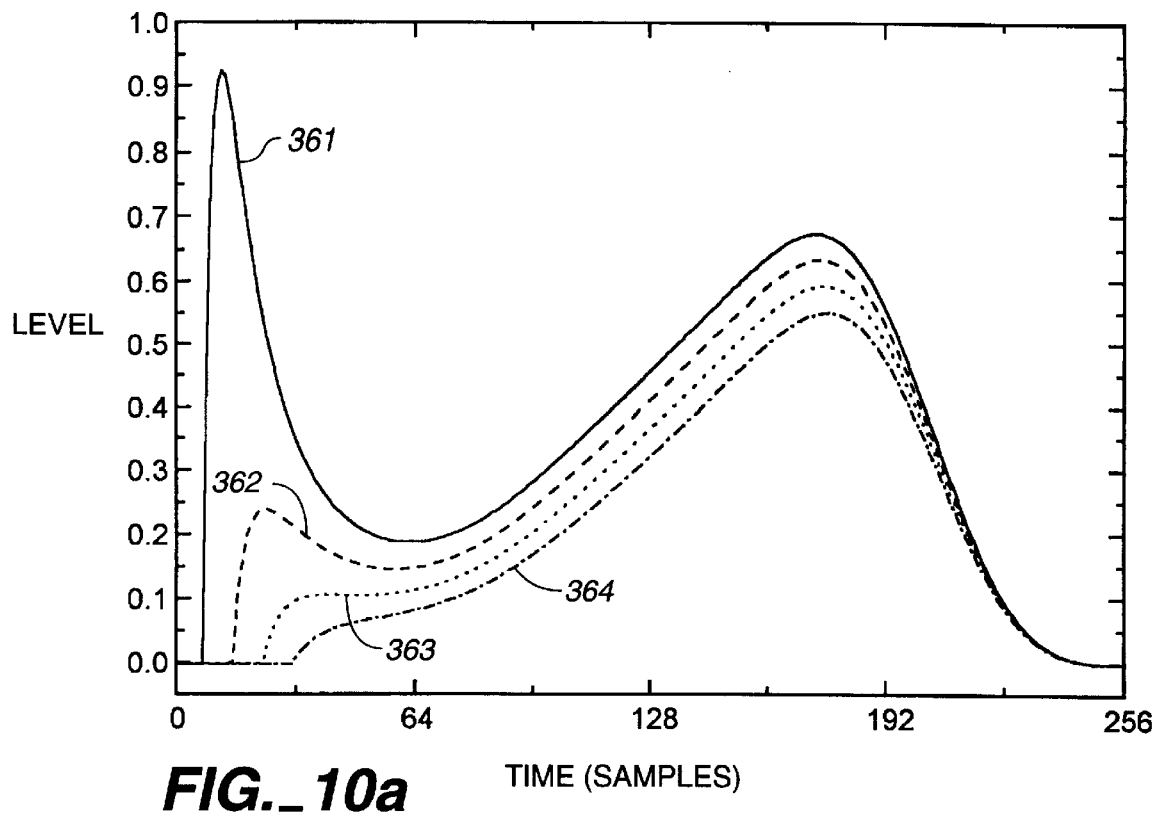
FIG._10a
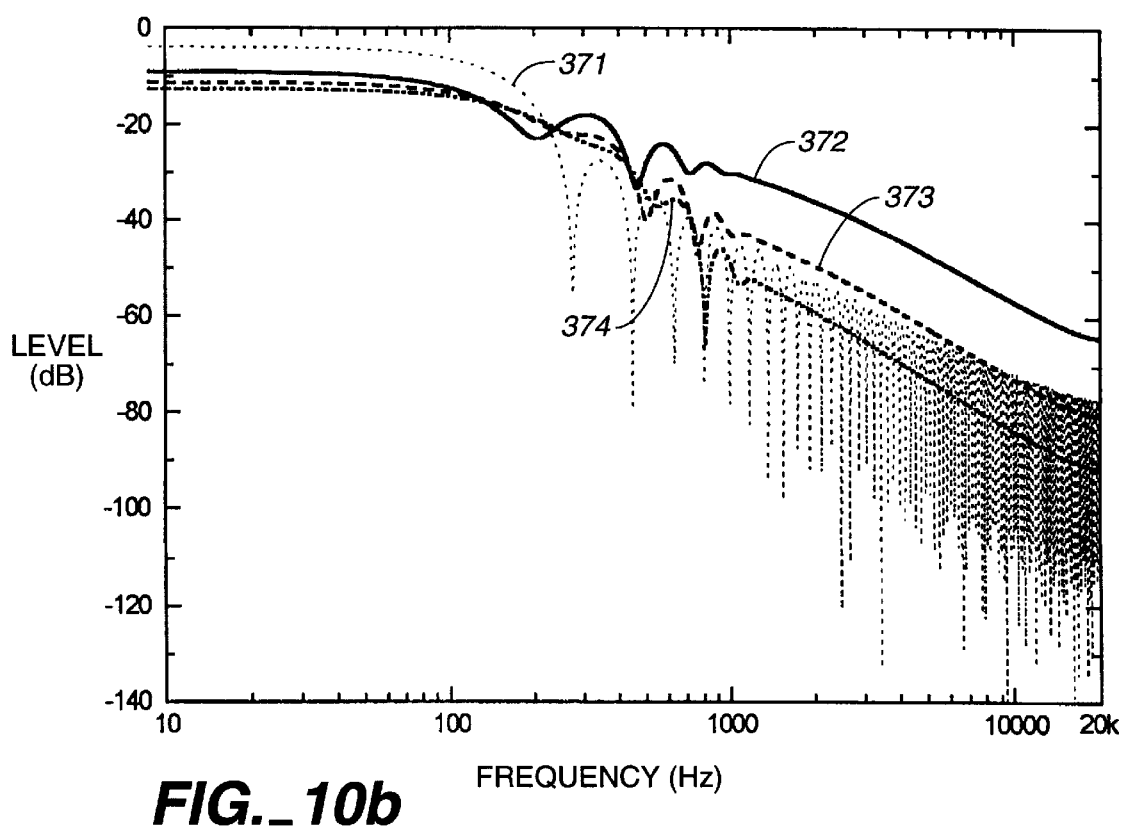
FIG._10b

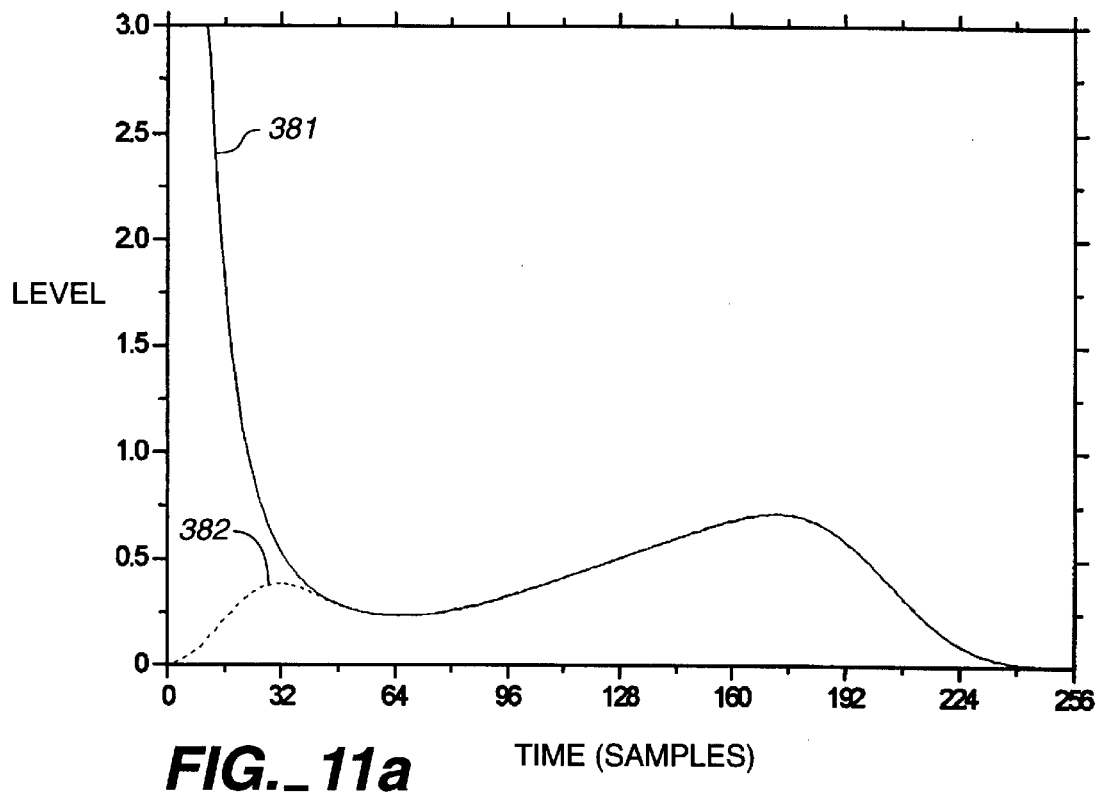
FIG._11a
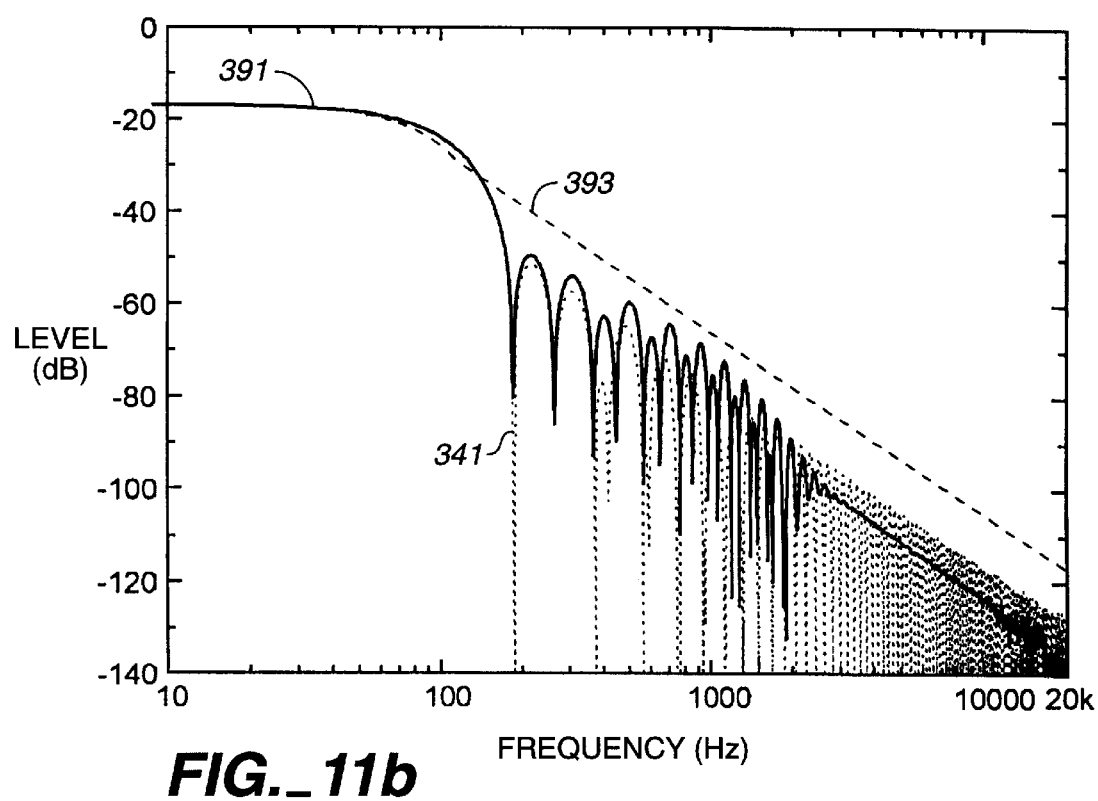
FIG._11b

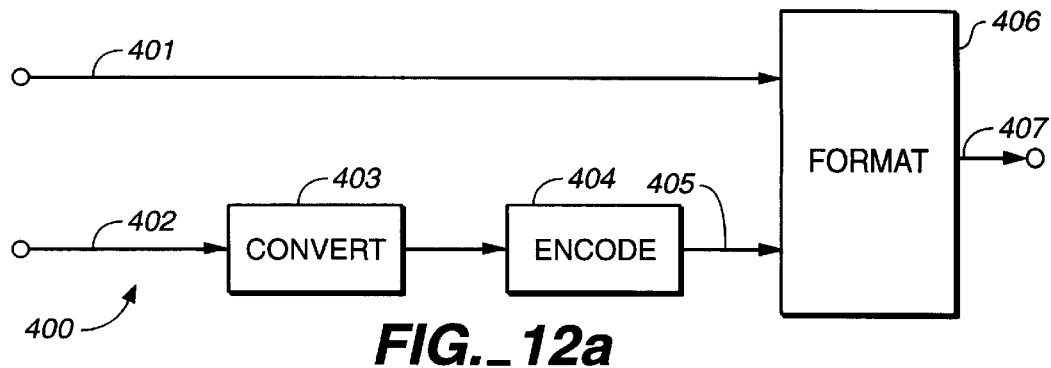
FIG._12a
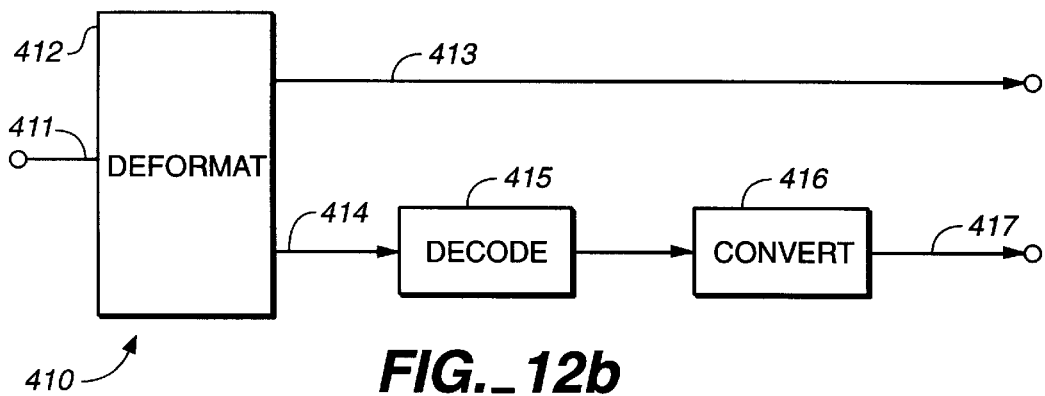
FIG._12b
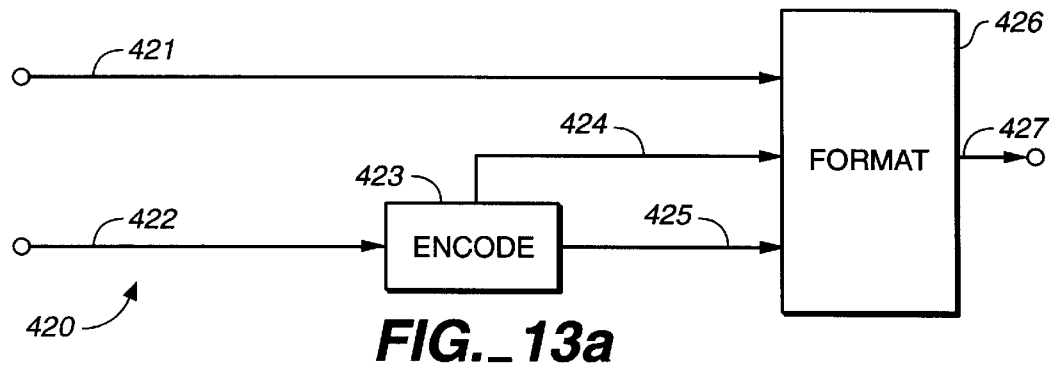
FIG._13a
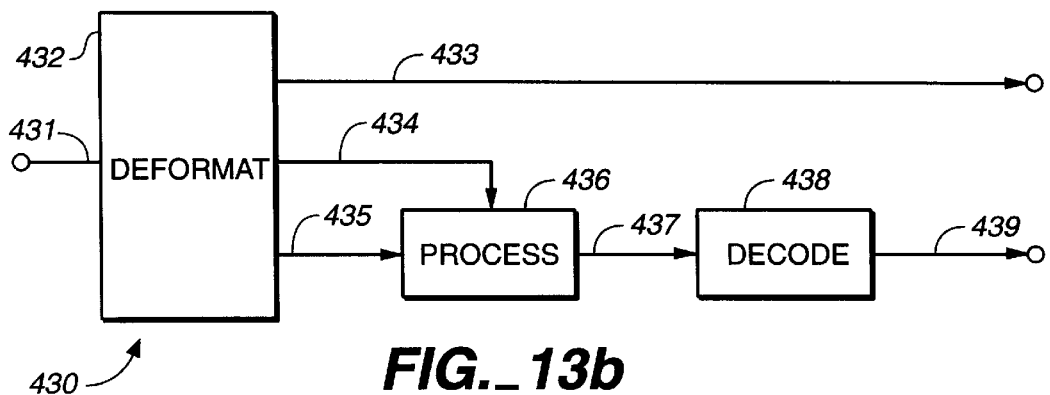
FIG._13b

| 451 → | 452 → | 453 → | 454 → | 455 → | 456 → | 457 → | 458 → | 459 → | 460 → |
|---|---|---|---|---|---|---|---|---|---|
| 1601 | 1602 | 1602 | 1601 | 1602 | 1602 | 1602 | 1601 | 1602 | 1601 |
| 3 | 4 | 0 | 1 | 2 | 4 | 0 | 1 | 2 | 3 |
| 0 | 1 | 2 | 3 | 4 | 0 | 1 | 2 | 3 | 4 |
| 3 | 3 | 3 | 3 | 3 | 4 | 4 | 4 | 4 | 4 |
| 1-1602 | 2-1602 | 1-1602 | 1-1601 | 1-1602 | 1-1602 | 1-1601 | 0-1601 | 1-1601 | 0-1601 |

FRAME-BASED AUDIO CODING WITH VIDEO/AUDIO DATA SYNCHRONIZATION BY DYNAMIC AUDIO FRAME ALIGNMENT

CROSS-REFERENCE TO RELATED APPLICATIONS

This application is related to four other applications: U.S. patent application entitled "Frame-Based Audio Coding With Gain-Control Words," U.S. patent application entitled "Frame-Based Audio Coding With Additional Filterbank to Suppress Aliasing Artifacts at Frame Boundaries," U.S. patent application entitled "Frame-Based Audio Coding With Additional Filterbank to Attenuate Spectral Splatter at Frame Boundaries" and U.S. patent application entitled "Frame-Based Audio Coding With Video/Audio Data Synchronization by Audio Sample Rate Conversion," all filed concurrently with this application.

TECHNICAL FIELD

The present invention is related to audio signal processing in which audio information streams are arranged in frames of information. In particular, the present invention is related to improving the audio quality of audio information streams formed by splicing frame-based audio information streams.

BACKGROUND ART

The process of editing audio or video material is essentially one of splicing or butting together two segments of material. A simple editing paradigm is the process of cutting and splicing motion picture film. The two segments of material to be spliced may originate from different sources, e.g., different channels of audio information, or they may originate from the same source. In either case, the splice generally creates a discontinuity in the audio or video material that may or may not be perceptible.

Audio Coding

Block Processing

The growing use of digital audio has tended to make it more difficult to edit audio material without creating audible artifacts. This has occurred in part because digital audio is frequently processed or encoded in blocks of digital samples that must be processed as a block. Many perceptual or psychoacoustic-based audio coding systems utilize filterbanks or transforms to convert blocks of signal samples into blocks of encoded subband signal samples or transform coefficients that must be synthesis filtered or inverse transformed as blocks to recover a replica of the original signal. At a minimum, an edit of the processed audio signal must be done at a block boundary; otherwise, audio information represented by the remaining partial block cannot be properly recovered.

Throughout the remainder of this discussion, terms such as "coding" and "coder" refer to various methods and devices for signal processing and other terms such as "encoded" refer to the results of such processing. None of these terms imply any particular form of processing such as those that reduce information irrelevancy or redundancy in a signal. For example, coding includes generating pulse code modulation (PCM) samples to represent a signal and arranging information into patterns or formats according to some specification. Terms such as "block" and "frame" as used in this disclosure refer to groups or intervals of information that may differ from what those same terms refer to elsewhere, such as in the ANSI S4.40-1992 standard, sometimes known as the AES-3/EBU digital audio standard. Terms such as "filter" and "filterbank" as used herein include essentially any form of recursive and non-recursive filtering such as quadrature mirror filters (QMF) and transforms, and "filtered" information is the result of applying such filters. More particular mention is made of filterbanks implemented by transforms.

An additional limitation is imposed on editing by coding systems that use overlapping-block structures to process and encode program material. Because of the overlapping nature of the encoded blocks, an original signal cannot properly be recovered from even a complete block of encoded samples or coefficients.

This limitation is clearly illustrated by a commonly used overlapped-block transform, the modified discrete cosine transform (DCT), that is described in Princen, Johnson, and Bradley, "Subband/Transform Coding Using Filter Bank Designs Based on Time Domain Aliasing Cancellation," ICASSP 1987 Conf. Proc., May 1987, pp. 2161–64. This transform is the time-domain equivalent of an oddly-stacked critically sampled single-sideband analysis-synthesis system and is referred to herein as Oddly-Stacked Time-Domain Aliasing Cancellation (O-TDAC). The forward transform is applied to blocks of samples that overlap one another by one-half the block length and achieves critical sampling by decimating the transform coefficients by two; however, the information lost by this decimation creates time-domain aliasing in the recovered signal. The synthesis process can cancel this aliasing by applying an inverse transform to the blocks of transform coefficients to generate blocks of synthesized samples, applying a suitably shaped synthesis window function to the blocks of synthesized samples, and overlapping and adding the windowed blocks. For example, if a TDAC coding system generates a sequence of blocks $B_1$–$B_2$, then the aliasing artifacts in the last half of block $B_1$ and in the first half of block $B_2$ will cancel one another.

If two encoded information streams from a TDAC coding system are spliced at a block boundary, the resulting sequence of blocks will not cancel each other's aliasing artifacts. For example, suppose one encoded information stream is cut so that it ends at a block boundary between blocks $B_1$–$B_2$ and another encoded information stream is cut so that it begins at a block boundary between blocks $A_1$–$A_2$. If these two encoded information streams are spliced so that block $B_1$ immediately precedes block $A_2$, then the aliasing artifacts in the last half of block $B_1$ and the first half of block $A_2$ will generally not cancel one another.

The methods and devices of the prior art have either ignored the problem or have provided unsatisfactory solutions. One solution reduces the audibility of the uncancelled aliasing artifacts by recovering or decoding the original audio from each encoded audio stream, crossfading one audio stream into the other, and re-encoding the resultant crossfaded stream into a new encoded audio stream. Unfortunately, the decode/re-encode process degrades the resulting signal, the process incurs a cost that is unattractive, and the original signal immediately on either side of the splice cannot be independently recovered because the crossfade cannot be undone.

Spectral Splatter

Splice edits create another problem that the prior art has failed to address. This problem is particularly troublesome with split-band perceptual coding techniques like perceptual coding. Perceptual split-band encoding applies a filterbank to an input signal to generate subband signals or groups of transform coefficients having bandwidths that are commensurate with the critical bandwidths of the human auditory system. Ideally, each subband signal or group of transform coefficients is quantized or encoded with just enough bits to render the resultant quantizing noise inaudible by having the noise masked by spectral components in the original signal. Coding performance is affected significantly by the frequency response characteristics of the filterbank applied to the input signal to generate the subband signals or transform coefficients. Generally, these characteristics are optimized by increasing the attenuation of frequencies in the filter stopband in exchange for a broader filter passband. For example, see U.S. Pat. No. 5,109,417.

Splice edits tend to generate significant spurious spectral components or "spectral splatter" within a range of frequencies that is usually within the filter passband or transition region between passband and stopband, and not within what is regarded as the filter stopband; hence, filterbanks that are designed to optimize general coding performance do not provide enough attenuation of the spectral splatter created at splice edits. These artifacts are usually audible because they are usually too large to be masked by the original signal.

Audio and Video Coding

Frame Synchronization

Even greater limitations are imposed upon editing applications that process both audio and video information for at least two reasons. One reason is that the video frame length is generally not equal to the audio block length. The second reason pertains only to certain video standards like NTSC that have a video frame rate that is not an integer multiple of the audio sample rate. All of the examples in the following discussion assume an audio sample rate of 48 k samples per second. Most professional equipment uses this rate. Similar considerations apply to other sample rates such as 44.1 k samples per second, which is typically used in consumer equipment.

The frame and block lengths for several video and audio coding standards are shown in Table I and Table II, respectively. Entries in the tables for "MPEG II" and "MPEG III" refer to MPEG-2 Layer II and MPEG-2 Layer III coding techniques specified by the Motion Picture Experts Group of the International Standards Organization in standard ISO/IEC 13818-3. The entry for "AC-3" refers to a coding technique developed by Dolby Laboratories, Inc. and specified by the Advanced Television Systems Committee in standard A-52. The "block length" for 48 kHz PCM is the time interval between adjacent samples.

TABLE I

| Video Frames | |
|---|---|
| Video Standard | Frame Length |
| DTV (30 Hz) | 33.333 msec. |
| NTSC | 33.367 msec. |
| PAL | 40 msec. |
| Film | 41.667 msec. |

TABLE II

| Audio Frames | |
|---|---|
| Audio Standard | Block Length |
| PCM | 20.8 μsec. |
| MPEG II | 24 msec. |
| MPEG III | 24 msec. |
| AC-3 | 32 msec. |

In applications where video and audio information is bundled together, audio blocks and video frames are rarely synchronized. The time interval between occurrences of audio/video synchronization is shown in Table III. For example, the table shows that motion picture film, at 24 frames per second, will be synchronized with an MPEG audio block boundary exactly once in each 3 second period and will be synchronized with an AC-3 audio block exactly once in each 4 second period.

TABLE III

| Time Interval Between Audio/Video Synchronization | | | | |
|---|---|---|---|---|
| Audio Standard | DTV (30 Hz) | NTSC | PAL | Film |
| PCM | 33.333 msec. | 166.833 msec. | 40 msec. | 41.667 msec. |
| MPEG II | 600 msec. | 24.024 sec. | 120 msec. | 3 sec. |
| MPEG III | 600 msec. | 24.024 sec. | 120 msec. | 3 sec. |
| AC-3 | 800 msec. | 32.032 sec. | 160 msec. | 4 sec. |

The interval between occurrences of synchronization, expressed in numbers of audio blocks to video frames, is shown in Table IV. For example, synchronization occurs exactly once between AC-3 blocks and PAL frames within an interval spanned by 5 audio blocks and 4 video frames. Significantly, five frames of NTSC video are required to synchronize with 8,008 samples of PCM audio. The significance of this relationship is discussed below.

TABLE IV

| Numbers of Frames Between Audio/Video Synchronization | | | | |
|---|---|---|---|---|
| Audio Standard | DTV (30 Hz) | NTSC | PAL | Film |
| PCM | 1600:1 | 8008:5 | 1920:1 | 2000:1 |
| MPEG II | 25:18 | 1001:720 | 5:3 | 125:72 |
| MPEG III | 25:18 | 1001:720 | 5:3 | 125:72 |
| AC-3 | 25:24 | 1001:960 | 5:4 | 125:96 |

When video and audio information is bundled together, editing generally occurs on a video frame boundary. From the information shown in Tables III and IV, it can be seen that such an edit will rarely occur on an audio frame boundary. For NTSC video and AC-3 audio, for example, the probability that an edit on a video boundary will also occur on an audio block boundary is only 1/960 or approximately 0.1 percent. Of course, both edits on either side of a splice must be synchronized in this manner, otherwise some audio information will be lost; hence, it is almost certain that a splice of NTSC/AC-3 information for two random edits will occur on other than an audio block boundary and will result in one or two blocks of lost audio information. Because AC-3 uses a TDAC transform, however, even cases in which no blocks of information are lost will result in uncancelled aliasing distortion for the reasons discussed above.

This problem is analogous to the audio block-processing problems discussed above. The methods and devices of the prior art have either ignored the video/audio framing problem or they have provided similar unsatisfactory solutions, i.e., perform "post processing" of the audio by unbundling the audio information from the video information, decoding the encoded audio information, editing the recovered audio information, and re-encoding and re-bundling the audio information with the video information.

Data Synchronization

It was noted above that 5 frames of NTSC video are required to synchronize with 8008 samples of PCM audio at 48 k samples per second. In other words, NTSC video frames do not divide the audio information into an integer number of samples. Each NTSC frame corresponds to 1601.6 samples. Similarly, NTSC frames do not divide encoded audio information into blocks of an integer number of samples or coefficients. This can be accommodated by arranging the audio samples into a repeating sequence of audio frames containing, for example, 1602, 1601, 1602, 1601 and 1602 samples, respectively; however, this imposes even greater restrictions on editing applications because edits must be done only at the beginning of the five-frame sequence, referred to herein as a "superframe." Unfortunately, in many applications, neither the video information nor the audio information bundled with the video conveys any indication of the superframe boundaries.

The varying length audio blocks within a superframe cause another problem for many coding applications. As explained above, many coding applications process encoded information in blocks. Unless the signal conveys some form of synchronization signal, a decoder cannot know where the boundary is for each superframe or whether an edit has removed part of a superframe. In other words, the decoder cannot know where the boundary is for each audio frame or block. It may be possible to reduce the uncertainty in the block boundary to as little as one sample; however, when audio information is processed in blocks, a one sample error is enough to prevent recovery of the recovered audio information.

DISCLOSURE OF INVENTION

It is an object of the present invention to improve the quality of audio represented by an audio information stream formed by splicing two or more frame-based audio information streams.

According to the teachings of one aspect of the present invention, a method or device for signal processing receives a first input signal comprising samples representing audio information at an audio sample rate, receives a second input signal comprising input frames conveying information at an input frame rate and grouped into superframes, generates in response to the first input signal a sequence of audio frames, each comprising encoded audio information that corresponds to an early sample, a nominal start sample and subsequent samples of the audio information, and generates an output signal arranged in output frames grouped into output superframes, where each frame includes a respective audio frame and a label that is unique within a respective superframe.

According to the teachings of another aspect of the present invention, a method or device for signal processing receives an input signal arranged in input frames grouped into input superframes, each input frame including a label that is unique within a respective superframe and a respective audio frame that represents encoded audio information at an input frame rate, derives from the audio frames sequences of samples representing audio information at an audio sample rate, each sequence corresponding to an early sample, a nominal start sample and subsequent samples, and generates an output signal in response to a portion of the sequences of samples, the start and end of the portion being determined in response to the labels, the audio sample rate and the input frame rate.

The various features of the present invention and its preferred embodiments may be better understood by referring to the following discussion and the accompanying drawings in which like reference numerals refer to like elements in the several figures. The drawings which illustrate various devices show major components that are helpful in understanding the present invention. For the sake of clarity, these drawings omit many other features that may be important in practical embodiments but are not important to understanding the concepts of the present invention. The signal processing required to practice the present invention may be accomplished in a wide variety of ways including programs executed by microprocessors, digital signal processors, logic arrays and other forms of computing circuitry. Signal filters may be accomplished in essentially any way including recursive, non-recursive and lattice digital filters. Digital and analog technology may be used in various combinations according to needs and characteristics of the application.

More particular mention is made of conditions pertaining to processing audio and video information streams; however, aspects of the present invention may be practiced in applications that do not include the processing of video information. The contents of the following discussion and the drawings are set forth as examples only and should not be understood to represent limitations upon the scope of the present invention.

BRIEF DESCRIPTION OF DRAWINGS

FIGS. 1a and 1b are schematic representations of video and audio information arranged in blocks, frames and superframes.

FIGS. 2a to 2c are schematic representations of overlapping blocks modulated by window functions and the resulting gain profile for frames comprising the windowed blocks.

FIG. 3 illustrates signal and aliasing components generated by an aliasing cancellation transform.

FIGS. 4a to 4c illustrate functional block diagrams of devices that create, change and respond to gain control words in an encoded information stream.

FIGS. 5a and 5b illustrate functional block diagrams of devices that apply alternate filterbanks to suppress aliasing artifacts at frame boundaries.

FIGS. 6a to 6d are schematic representations of window functions that may be used to suppress aliasing artifacts at frame boundaries.

FIG. 7 illustrates frequency response characteristics that result from using various window functions at frame boundaries.

FIG. 8 illustrates a functional block diagram of a device that applies alternate filterbanks to increase the attenuation of spectral splatter at splices.

FIGS. 9, 10a and 11a are schematic representations of several window functions that pertain to the device of FIG. 8.

FIGS. 10b and 11b illustrate frequency response characteristics that result from using various window functions in the device of FIG. 8.

FIGS. 12a and 12b illustrate functional block diagrams of devices that provide for sample rate conversion to achieve synchronization between audio samples and video frames.

FIGS. 13a and 13b illustrate functional block diagrams of devices that provide for dynamic audio frame alignment to achieve synchronization with video superframes across a splice.

FIG. 14 is a schematic representation of video frame characteristics and the effects of dynamic audio frame alignment across a splice.

MODES FOR CARRYING OUT THE INVENTION

Signals and Processing

Signal Blocks and Frames

FIG. 1a illustrates a stream of encoded audio information arranged in a sequence of audio blocks 10 through 18, and video information arranged in a sequence of video frames such as video frame 1. In some formats such as NTSC video, each video frame comprises two video fields that collectively define a single picture or image. Audio blocks 11 through 17 are grouped with video frame 1 into an encoded signal frame 21.

As discussed above and shown in Table IV, some applications have video frames that do not divide the encoded audio into an integer number of samples, transform coefficients, or the like. This can be accommodated by arranging groups of encoded signal frames into respective superframes. An arrangement of five encoded signal frames 21 through 25 grouped into superframe 31 is illustrated in FIG. 1b. This particular arrangement may be used for applications using NTSC video and 48 k sample/sec. PCM audio.

Processed Signal Blocks

A sequence of blocks of encoded audio information may represent overlapping intervals of an audio signal. Some split-band perceptual coding systems, for example, process blocks of audio samples that overlap one another by half the block length. Typically, the samples in these overlapping blocks are modulated by an analysis window function.

FIG. 2a illustrates the modulation envelopes 61 through 67 of an analysis window function applied to each block in a sequence of overlapping audio blocks. The length of the overlap is equal to one half the block length. This overlap interval is commonly used by some signal analysis-synthesis systems such as the O-IDAC transform mentioned above.

FIG. 2b illustrates the resulting modulation envelope of a window function applied to a sequence of overlapping blocks for an encoded signal frame. As illustrated in FIG. 2b, the net effect or gain profile 81 of this modulation is the sum of the modulation envelopes 71 through 77 for adjacent blocks in the overlap intervals. Preferably, the net effect across each overlap should be unity gain.

FIG. 2c illustrates the overall effect of window function modulation across adjacent encoded signal frames. As illustrated, gain profiles 80 through 82 overlap and add so that the net effect is unity gain.

In systems that use only analysis window functions, the net effect of all window function modulation is equivalent to the modulation effects of the analysis window function alone. The ideal gain profile can be achieved by ensuring that the modulation envelope of the analysis window function overlaps and adds to a constant.

In systems that use analysis and synthesis window functions, the net effect of all window function modulation is equivalent to that of a "product" window function formed from a product of the analysis window function and the synthesis window function. In such systems, the ideal gain profile can be achieved by having the modulation envelope of the product window function add to a constant in the overlap interval.

Throughout this disclosure, some mention is made of coding systems and methods that use both analysis and synthesis window functions. In this context, the gain profile resulting from overlapped analysis window functions will sometimes be said to equal a constant. Similarly, the gain profile resulting from overlapped synthesis window functions will sometimes be said to equal a constant. It should be understood that such descriptions are intended to refer to the net modulation effect of all windowing in the system.

Window Function

The shape of the analysis window function not only affects the gain profile of the signal but it also affects the frequency response characteristic of a corresponding filterbank.

Spectral Splatter

As mentioned above, many perceptual split-band coding systems use filterbanks having frequency response characteristics optimized for perceptual coding by increasing the attenuation of frequencies in the filter stopband in exchange for a broader filter passband. Unfortunately, splice edits tend to generate significant spectral artifacts or "spectral splatter" within a range of frequencies that is not within the what is regarded as the filter stopband. Filterbanks that are designed to optimize general perceptual coding performance do not provide enough attenuation to render inaudible these spectral artifacts created at splice edits.

TDAC Transform Aliasing Cancellation

With respect to the O-TDAC transform, the analysis window function, together with a synthesis window function that is applied after application of the synthesis transform, must also satisfy a number of constraints to allow cancellation of the time-domain aliasing artifacts.

The signal that is recovered from the synthesis transform can be conceptualized as a sum of the original signal and the time-domain aliasing components generated by the analysis transform. In FIG. 3, curves 91, 93 and 95 represent segments of the amplitude envelope of an input signal as recovered from the inverse or synthesis transform and modulated by analysis and synthesis window functions. Curves 92, 94 and 96 represent the time-domain aliasing components as recovered from the inverse or synthesis transform and modulated by analysis and synthesis window functions. As may be seen in the figure and will be explained below, the time-domain aliasing components are reflected replicas of the original input signal as modulated by the analysis and synthesis window functions.

The kernel functions of the analysis and synthesis O-TDAC transforms are designed to generate time-domain aliasing components that are end-for-end reflections of the windowed signal in each half of a block. As disclosed by Princen, et al., the O-TDAC transform generates time-domain aliasing components in two different regions. In region 2, the time-domain aliasing component is an end-for-end windowed reflection of the original signal in that region.

In region 1, the time-domain aliasing component is an end-for-end windowed reflection of the input signal within that region, but the amplitude of the reflection is inverted.

For example, aliasing component 94a is an end-for-end windowed reflection of signal component 93a. Aliasing component 92b is also an end-for-end windowed reflection of signal component 91b except that the amplitude of the reflected component is inverted.

By overlapping and adding adjacent blocks, the original signal is recovered and the aliasing components are cancelled. For example, signal components 91b and 93a are added to recover the signal without window function modulation effects, and aliasing components 92b and 94a are added to cancel aliasing. Similarly, signal components 93b and 95a are added to recover the signal and aliasing components 94b and 96a are added to cancel aliasing.

Time-domain aliasing artifacts on either side of a splice boundary will generally not be cancelled because the aliasing artifacts in the half-block of synthesized audio samples immediately preceding the splice will not be the inverse of the aliasing artifacts in the half-block of synthesized audio block immediately after the splice.

Similar considerations apply to other aliasing cancellation filterbanks such as one described in Princen and Bradley, "Analysis/Synthesis Filter Bank Design Based on Time Domain Aliasing Cancellation," IEEE Trans. on Acoust., Speech, Signal Proc., vol. ASSP-34, 1986, pp. 1153–1161. This filterbank system is the time-domain equivalent of an evenly-stacked critically sampled single-sideband analysis-synthesis system and is referred to herein as Evenly-Stacked Time-Domain Aliasing Cancellation (E-TDAC).

Gain Control to Attenuate Artifacts at Splices

A technique that may be used to reduce the audibility of artifacts created by a splice is to incorporate into an encoded audio signal a plurality of gain-control words that instruct a decoder or playback system to alter the amplitude of the playback signal. Simple embodiments of devices that use these gain-control words are discussed in the following paragraphs.

FIG. 4a illustrates a functional block diagram of device 100 in which format 111 generates along path 112 an output signal arranged in frames comprising video information, encoded audio information representing multiple audio channels, and gain-control words. Format 111 generates the output signal in response to a signal received from path 108 that is arranged in frames conveying video information and encoded audio information for the multiple audio channels, and in response to a signal received from path 110 that conveys gain-control words. Process 109 receives multiple control signals from paths 103a and 103b, each associated with one of the multiple audio channels, and in response to each control signal, generates along path 110 a pair of gain-control words for an associated audio channel that represent a starting gain and an ending gain within a respective frame. Only two control signals 103 and two associated audio channels 102 are shown in the figure for the sake of clarity. This gain-control technique may be applied to more that two channels if desired.

In the embodiment shown, encode 105 generates along paths 106a and 106b encoded audio information for multiple audio channels in response to multiple audio channel signals received from paths 102a and 102b, and frame 107 generates the signal along 108 by arranging in frames video information received from path 101 and the encoded audio information received from paths 106a and 106b.

This gain-control technique may be used with input signals that are analogous to the signal passed along path 108; therefore, neither encode 105 nor frame 107 are required. In embodiments that include encode 105, encoding may be applied to each audio channel independently or it may be applied jointly to multiple audio channels. For example, the AC-3 encoding technique may be applied jointly to two or more audio channels to lower total bandwidth requirements by removing or reducing redundancies between the channels.

FIG. 4c illustrates a functional block diagram of device 140 that generates output signals to reproduce or playback multiple audio channels according to gain-control words in an input signal. Deformat 142 receives from path 141 an input signal arranged in frames comprising video information, encoded audio information and gain-control words. Deformat 142 obtains from each frame of the input signal encoded audio information representing multiple audio channels and obtains a pair of gain-control words associated with each of the audio channels. Process 148 receives the gain-control words from path 145 and in response generates gain control signals along paths 149a and 149b. Decode 146 receives the multiple channels of encoded audio information from paths 144a and 144b and in response generates an output signal for each audio channel such that the amplitude or level of each output signal is varied in response to an associated gain control signal.

A pair of gain-control words represents a starting gain and an ending gain for a respective audio channel within a particular frame. Process 148 generates gain control signals representing an interpolation of the pair of gain-control words. The interpolation may follow any desired trajectory such as linear, quadratic, logarithmic or exponential. With linear interpolation, for example, a gain control signal would represent a gain that changes linearly across a particular frame.

Decoding may be applied to each audio channel independently or it may be applied jointly to multiple audio channels. For example, decoding may be complementary to forms of encoding that remove or reduce redundancies between the channels. In split-band coding applications that use a synthesis filterbank and a synthesis window function, the output signal may be effectively modulated according to a gain control signal by modifying encoded audio prior to application of the synthesis filterbank, by modifying synthesized audio obtained from the synthesis filterbank prior to synthesis windowing, or by modifying the audio information obtained from the application of the synthesis window function.

FIG. 4b illustrates a functional block diagram of device 120 that modifies existing gain-control words in a signal. Deformat 123 receives from path 121 an input signal arranged in frames comprising video information, encoded audio information representing multiple audio channels, and input gain-control words. Deformat 123 obtains from the input signal one or more input gain-control words associated with the encoded audio information for one of the multiple audio channels and passes the input gain control words along paths 124a and 124b. Process 126 generates one or more output gain-control words along path 127 by modifying one or more input gain-control words in response to a control signal received from path 122. Format 128 generates along path 129 an output signal that is arranged in frames including the video information, the encoded audio information for the multiple audio channels, the output gain control words and the input gain-control words that do not correspond to the output gain-control words.

In an editing application, control signal 122 indicates a splice in input signal 121. In response, process 126 generates one or more output gain-control words that will cause a device such as device 140 to attenuate a playback signal immediately prior to the splice and to reverse the attenuation immediately after the splice. The change in gain may extend across several frames; however, in many applications the change is limited to one frame on either side of the splice. The gain-change interval may be determined by balancing the audibility of modulation products produced by the gain change with the audibility of the gain change itself The gain-control word technique is not limited to editing applications.

Filterbanks to Suppress Aliasing at Frame Boundaries

In coding systems using a form of aliasing cancellation such as that provided by one of the TDAC transforms, splice edits prevent aliasing artifacts from being cancelled on each side of the splice for reasons that are discussed above. These uncancelled aliasing artifacts may be avoided by applying alternate filterbanks to the audio blocks at the start and end of each frame. Referring to frame 21 shown FIG. 1a, for example, a first filterbank is applied to block 11, a second filterbank is applied to blocks 12 through 16, and a third filterbank is applied to block 17. The characteristics of these filterbanks is such that the audio recovered from each frame contains substantially no uncancelled aliasing artifacts.

Referring to FIG. 5a, device 200 comprises buffer 202 that receives blocks of audio information and generates along path 203 a control signal indicating whether an audio block is the first or start block in a frame, the last or end block in the frame, or an interim block in the frame. In response to the control signal received from path 203, switch 204 directs the first or start block in each frame to first filterbank 205, directs all interim blocks in each frame to second filterbank 206, and directs the last or end block in each frame to third filterbank 207. Format 208 assembles the filtered audio information received from each of the three filterbanks into an output signal passed along path 209.

FIG. 5b illustrates device 220 in which deformat 222 receives an input signal from path 221, obtains therefrom encoded audio information that is passed along path 224, and generates a control signal along path 223 indicating whether the encoded audio information is the first or start block in a frame, the last or end block in the frame, or an interim block in the frame. In response to the control signal received from path 223, switch 225 directs encoded audio information to one of three synthesis filterbanks. Switch 225 directs encoded audio information for the first block to first synthesis filterbank 226, encoded audio information for interim blocks to second synthesis filterbank 227, and encoded audio information for the last block to third synthesis filterbank 228. Buffer 229 generates an output signal along path 230 in response to the synthesized audio blocks received from the three synthesis filterbanks.

Second Filterbank

In one embodiment of an encoder, the second filterbank is implemented by an N-point modified DCT and an N-point analysis window function according to the O-TDAC transform as disclosed in Princen, et al., cited above. In a complementary decoder, the second filterbank is implemented by an N-point modified inverse DCT and an N-point synthesis window function according to the O-TDAC transform. The forward and inverse O-TDAC transforms are shown in expressions 1 and 2, respectively:

$$X(k) = \sum_{n=0}^{M-1} x(n)\cos\left[\frac{2\pi}{M}\left(k+\frac{1}{2}\right)\left(n+\frac{m+1}{2}\right)\right] \text{ for } 0 \le k < M \quad (1)$$

$$x(n) = \frac{1}{M} \sum_{k=0}^{M-1} X(k)\cos\left[\frac{2\pi}{M}\left(k+\frac{1}{2}\right)\left(n+\frac{m+1}{2}\right)\right] \text{ for } 0 \le n < M \quad (2)$$

where $k$ = frequency index, $n$ = signal sample number, $M$ = sample block length, $m$ = phase term for O-TDAC, $x(n)$ = windowed input signal sample $n$, and $X(k)$ = transform coefficient $k$.

The second filterbanks are of length M=N and create two regions of aliasing reflection with a boundary between the two regions at the mid-point of a block, as shown in FIG. 3. The TDAC phase term required to create these two regions is m=N/2.

In a preferred embodiment, the analysis and synthesis window functions are derived according to a technique described below. The shape of these window functions is illustrated by curve 242 in FIG. 6a. For ease of discussion, these window functions are referred to as W$_2$(n).

First Filterbank

In this same embodiment, the first filterbanks in the encoder and complementary decoder are implemented by the modified DCT shown above and a modified form of window function W$_2$(n). The forward and inverse transforms are shown in expressions 1 and 2, respectively. The first filterbanks are of length M=3N/2 and create a single region 1 of aliasing reflection. Aliasing artifacts are an inverted end-to-end reflection of the signal in the block. In effect, reflection region 2 is of length zero and the boundary between the two regions is at the leading edge or right-hand edge of the block. The TDAC phase term required to create this single region is m=0.

The analysis and synthesis window functions W$_1$(n) for the first filterbanks are identical. The shape of this window function is illustrated by curve 241 in FIG. 6b. It is composed of three portions. The first and second portions, designated as segments 1 and 2, are identical to window function W$_2$(x) described above and shown in FIG. 6a. The third portion, designated as segment 3, is equal to zero.

This first analysis window function W$_1$(n) ensures that the signal in segment 3 is zero. As a result, the aliasing artifacts that are reflected from segment 3 into segment 1 are also zero. The aliasing artifacts that are reflected from segment 1 into segment 3 will not generally be zero; however, any artifacts that are reflected into segment 3 will be eliminated when the first synthesis window function W$_1$(n) is applied to the synthesized audio block. As a result, aliasing artifacts exist only in segment 2.

Third Filterbank

In this same embodiment, the third filterbanks in the encoder and complementary decoder are implemented by the modified DCT shown above and a modified form of window function W$_2$(n). The forward transform and inverse transforms are shown in expressions 1 and 2, respectively. The third filterbanks are of length M=3N/2 and create a single region 2 of aliasing reflection. Aliasing artifacts are an end-to-end reflection of the signal in the block. In effect, reflection region 1 is of length zero and the boundary between the two regions is at the trailing edge or left-hand edge of the block. The TDAC phase term required to create this single region is m=3N /2.

The analysis and synthesis window functions $W_3(n)$ for the third filterbanks are identical. The shape of one suitable window function is illustrated by curve 243 in FIG. 6c. It is composed of three portions. The first portion, designated as segment 1, is zero. The second and third portions, designated as segments 2 and 3, are identical to window function $W_2(x)$ described above and shown in FIG. 6a.

This third analysis window function $W_3(n)$ ensures that the signal in segment 1 is zero. As a result, the aliasing artifacts that are reflected from segment 1 into segment 3 are also zero. The aliasing artifacts that are reflected from segment 3 into segment 1 will not generally be zero; however, any artifacts that are reflected into segment 1 will be eliminated when the third synthesis window function $W_3(n)$ is applied to the synthesized audio block. As a result, aliasing artifacts exist only in segment 2.

FIG. 6d illustrates how window functions $W_1(n)$, $W_2(n)$ and $W_3(n)$ 241 through 243 overlap with one another. Gain profile 240 represents the net effect of end-to-end windowing which, for TDAC, is a sequence of overlapping product window functions formed from the product of corresponding analysis and synthesis window functions. The aliasing artifacts in segment 2 of block 11 weighted by analysis-synthesis window functions $W_1(n)$ are cancelled by the aliasing artifacts in the first half of block 12 weighted by analysis-synthesis window functions $W_2(n)$. The aliasing artifacts in segment 2 of block 17 weighted by analysis-synthesis window functions $W_3(n)$ are cancelled by the aliasing artifacts in the last half of block 16 weighted by analysis-synthesis window functions $W_2(n)$. Signal recovery and aliasing cancellation in interim block pairs such as blocks 12 and 13 or blocks 15 and 16 is accomplished according to conventional TDAC.

By using this technique, splice edits may be made at any frame boundary and no aliasing artifacts will remain uncancelled.

Derivation of Window Functions

Window function $W_2(n)$ may be derived from a basis window function using a technique described in the following paragraphs. Although any window function with the appropriate overlap-add properties may be used as the basis window function, the basis window functions used in a preferred embodiment is the Kaiser-Bessel window function:

$$W_{KB}(n) = \frac{I_0\left[\pi\alpha\sqrt{1-\left(\frac{n}{N/2}\right)^2}\right]}{I_0[\pi\alpha]} \quad \text{for } 0 \leq n < N \quad (3)$$

where $\alpha$ = Kaiser-Bessel window function alpha factor, $n$ = window sample number, $N$ = window length in number of samples, and $$I_0[x] = \sum_{k=0}^{\infty} \frac{(x/2)^k}{k!}.$$

The derivation generates an analysis-synthesis product window function $W_P(n)$ by convolving the Kaiser-Bessel window function $W_{KB}(n)$ with a rectangular window function $s(k)$ having a length equal to the block length N minus the overlap interval v, or:

$$WP(n) = \frac{\sum_{k=0}^{N-1} s(k) W_{KB}(n-k)}{\sum_{k=0}^{v} W_{KB}(k)} \quad \text{for } 0 \leq n < N$$

This may be simplified to:

$$WP(n) = \frac{\sum_{k=0}^{N-v-1} W_{KB}(n-k)}{\sum_{k=0}^{v} W_{KB}(k)} \quad \text{for } 0 \leq n < N$$

where $n$ = product-window sample number, $v$ = number of samples within window overlay interval, $N$ = desired length of the product-window $W_{KB}(n)$ = basis window function of length $v + 1$, $WP(n)$ = derived product-window of length $N$, and $$s(k) = \begin{cases} 1 & \text{for } 0 \leq k < N-v \\ 0 & \text{otherwise.} \end{cases}$$

For the O-TDAC transform, the overlap interval v=N/2 and the analysis window function and synthesis window functions are identical; therefore, either window function may be obtained from:

$$W_2(n) = \sqrt{\frac{\sum_{k=0}^{N/2-1} W_{KB}(n-k)}{\sum_{k=0}^{N/2} W_{KB}(k)}} \quad \text{for } 0 \leq n < N \quad (4)$$

The analysis and synthesis window functions that are derived in this manner are referred to herein as a Kaiser-Bessel-Derived (KBD) window function. The product window function is referred to as a KBD product window function. The alpha factor for the basis Kaiser-Bessel window function may be chosen to optimize coding performance. In many applications, an optimum alpha factor for coding is in the range from 2 to 6.

The absence of uncancelled aliasing artifacts throughout the frame allows essentially any window function to be used at a splice. Generally, these window functions have a shape that preserves a constant gain profile across the overlap interval. At splices, the overlap interval can extend across many frames; however, it is anticipated that many applications will use a "splice-overlap interval" that is in the range of 5 to 30 msec. For reasons that will be discussed below, it is significant that the overlap interval across a splice can be increased.

Filterbanks to Reduce Spectral Splatter at Splices

An alpha factor within the range mentioned above is optimum for many coding applications in the sense that perceptual coding is optimized. As mentioned above, coding is generally optimized by increasing the attenuation of frequencies in the filter stopband in exchange for a broader filter passband. An example of a typical frequency response for a filter that is optimized for perceptual coding is shown by curve 342 in FIG. 7. This curve represents the frequency response of the frame gain profile of a O-TDAC analysis-synthesis system using KBD window functions with $\alpha=6$ and having a frame overlap interval equal to 256 samples.

Although the boundary between passband and stopband is not sharply defined, in this example the passband covers frequencies up to about 200 Hz and the stopband covers frequencies above about 1 kHz. A transition region extends between the two bands.

In applications using transforms applied to 256-sample blocks, splice edits tend to generate significant spurious spectral components or "spectral splatter" within about 200 Hz to 1 kHz of a filter's center frequency. For applications using blocks of other lengths, this frequency range may be expressed in terms of two constants divided by the block length; hence, significant spectral splatter occurs within a range of frequencies expressed in Hz from about 50,000 to about 256,000, each divided by the block length.

In the example shown in FIG. 7, these frequencies are outside of what is regarded to be the filter stopband. Filterbanks that are designed to optimize perceptual coding performance do not provide enough attenuation of the spectral splatter created at splice edits. These artifacts are usually audible because they are usually too large to be masked by the signal.

Curve 341 and curve 343 in FIG. 7 illustrate the frequency responses of two other analysis-synthesis systems that provides significantly less attenuation in the stopband but provides more attenuation in a range of frequencies affected by the spectral splatter created at splices. Some performance in perceptual coding is sacrificed to increase attenuation of the spectral splatter. Preferably, the frequency response optimizes the attenuation of spectral energy within a range of frequencies including 200 Hz and 600 Hz for a system that filters 256-sample blocks, or frequencies of about 50,000 and 150,000, each divided by the block length.

Sometimes a compromise can be reached satisfying frequency response requirements for both general coding and for crossfading frames at splices. In applications where such a compromise cannot be achieved, a splice is detected and the frequency response of the analysis-synthesis system is changed. This change must be accomplished in conjunction with synthesis filtering because the analysis filterbank cannot generally anticipate splicing operations.

FIG. 8 illustrates device 320 that may be used to reduce spectral splatter at a splice by altering the end-to-end frequency response of an analysis-synthesis system. In this device, deformat 322 receives an input signal from path 321, obtains therefrom encoded audio information that is passed along path 324, and generates a control signal along path 323 indicating whether a splice occurs at either the start of the end of a frame. The occurrence of a splice may be expressly conveyed in the input signal or it may be inferred from other information conveyed in the signal.

For example, according to the AES-3/EBU standard, successive blocks of audio information contain block numbers that increment from zero to 255 and then wrap around to zero. Two adjacent block numbers that are not sequential could indicate a splice; however, this test is not reliable because some devices which process the AES/EBU data stream do not increment this number. If the audio stream is encoded, the encoding scheme may provide sequential numbering or some other form of predictable information. If the information does not conform to what is expected, a signal can be generated to indicate the presence of a splice.

In response to the control signal received from path 323, switch 325 directs encoded audio information to one of three synthesis filterbanks. Switch 325 directs encoded audio information for the first block in a frame following a splice to first synthesis filterbank 326, encoded audio information for the last block in a frame preceding a splice to third synthesis filterbank 328, and encoded audio information for other blocks to second synthesis filterbank 327. Alternatively, encoded audio information for these other blocks could be directed to one of three filterbanks according to the technique discussed above in connection with FIG. 5b. Buffer 329 generates an output signal along path 330 in response to the synthesized audio blocks received from the three synthesis filterbanks.

The first and third synthesis filterbanks are designed to achieve a desired frequency response in conjunction with some analysis filterbank. In many applications, this analysis filterbank is designed to optimize general coding performance with the second synthesis filterbank. The first and third synthesis filterbanks may be implemented in essentially any manner that provides the desired overall frequency response. Generally, the two filterbanks will have identical frequency responses but will have impulse responses that are time-reversed replicas of one another. In applications that implement filterbanks using transforms and window functions, the appropriate filterbanks can be implemented by using synthesis window functions that increase the overlap interval between adjacent frames on either side of a splice.

Modulation of Synthesized Audio

This may be accomplished in several ways. One way modulates the synthesized audio signal recovered from the synthesis filterbank so that frames on either side of a splice crossfade into one another. This may be accomplished in a device such as device 140 illustrated in FIG. 4c. Decoder 146 reduces the amplitude of the synthesized signal in the frame preceding the splice across a desired splice-overlap interval. In effect, the gain profile of the frame preceding the splice decreases from unity to some lower level across this interval. Decode 146 also increases the amplitude of the synthesized signal in the frame following the splice across the desired splice-overlap interval. In effect, the gain profile of the frame following the splice increases from the lower level to unity across this interval. If the effective changes in gain profiles account for the modulation effects of analysis-synthesis windowing, the overall gain of the overlapped frames can be preserved.

The effective change in gain profiles can be linear. Curve 343 in FIG. 7 illustrates the frequency response characteristics of a linearly tapered frame gain profile of about 5 msec. in duration. At a sample rate of 48 k samples per second, this interval corresponds to about 256 samples. In many coding applications, transforms are applied to sample blocks having 256 samples; therefore, in these particular applications, a ramp or linearly tapered gain profile of 256 samples extends across an "end" block at the frame boundary and across part of an adjacent block that overlaps this end block. This is equivalent to applying one filterbank to the end block, applying another filterbank to the immediately adjacent block, and yet another filterbank to other blocks in the interior of the frame. Referring to device 320 illustrated in FIG. 8, two additional synthesis filterbanks would be required to process the blocks adjacent to and overlapping the "end" blocks.

The frequency response of this linearly-tapered ramp represents a reference response against which other frequency responses may be evaluated. Generally, filterbanks that optimize the attenuation of spectral energy with respect to this reference response are effective in reducing the spectral splatter that is created at splices.

Modified Synthesis Window Function

Another way to alter the overall frequency response characteristics of an analysis-synthesis system is to modify the synthesis window function so that the net effect of analysis-synthesis windowing achieves the desired response. In effect, the overall frequency response is changed according to the resulting analysis-synthesis product window function.

Curve 341 in FIG. 7 represents a frequency response that attenuates spectral splatter at splices to a greater extent than the frequency response of the 5 msec. linearly-tapered gain profile represented by curve 343. The response of curve 341 is achieved by O-TDAC analysis-synthesis system using 256-point transforms and KBD window functions with α=1. As mentioned above, curve 342 corresponds to KBD window functions with α=6.

The end-to-end frequency response of these analysis-synthesis systems is equivalent to the frequency response of the window formed from the product of the analysis window function and the synthesis window function. This can be represented algebraically as:

$$WP_6(n) = WA_6(n)WS_6(n) \quad (5a)$$

$$WP_1(n) = WA_1(n)WS_1(n) \quad (5b)$$

where $WA_6(n)$ = analysis KBD window function with $\alpha = 6$, $WS_6(n)$ = synthesis KBD window function with $\alpha = 6$, $WP_6(n)$ = KBD product window function with $\alpha = 6$, $WA_1(n)$ = analysis KBD window function with $\alpha = 1$, $WS_1(n)$ = synthesis KBD window function with $\alpha = 1$, and $WP_1(n)$ = KBD product window function with $\alpha = 1$.

If a synthesis window function is modified to convert the end-to-end frequency response to some other desired response, it must be modified such that a product of itself and the analysis window function is equal to the product window that has the desired response. If a frequency response corresponding to $WP_1$ is desired and analysis window function $WA_6$ is used for signal analysis, this relationship can be represented algebraically as:

$$WP_1(n) = WA_6(n) \, WX(n) \quad (5c)$$

where WX(n)=synthesis window function needed to convert the frequency response. This can be written as:

$$WX(n) = \frac{WP_1(n)}{WA_6(n)} \quad (5d)$$

The actual shape of window function WX is somewhat more complicated than what is shown in expression 5d if the splice-overlap interval extends to a neighboring audio block that overlaps the "end" block in the frame. This will be discussed more fully below. In any case, expression 5d accurately represents what is required of window function WX in that portion of the end block which does not overlap any other block in the frame. For systems using O-TDAC, that portion is equal to half the block length, or for $0 \leq n < N/2$.

If the synthesis window function WX is used to convert the end-to-end frequency response from a higher alpha profile to a lower alpha profile, it must have very large values near the frame boundary. An example is shown in FIG. 9 in which curve 351 illustrates a KBD analysis or synthesis window function with α=1, curve 352 illustrates a KBD product window with α=1, curve 356 illustrates a KBD analysis or synthesis window function with α=6, and curve 359 illustrates a synthesis window function according to expression 5d. As curve 356 approaches the frame boundary, it becomes very much smaller than curve 352; therefore, curve 359 becomes very large. Unfortunately, a synthesis window function that has a shape like curve 359 having the large increase at the edge of window function WX has very poor frequency response characteristics and will degrade the sound quality of the recovered signal. Two techniques that may be used to solve this problem are discussed below.

Discarding Samples

The first technique for modifying a synthesis window function avoids large increases in window function WX by discarding some number of samples at the frame boundary where the analysis window function has the smallest values. By varying the number of samples discarded, the bandwidth required to convey samples in the frame overlap interval can be traded off against the decrease in system coding performance caused by poor frequency response characteristics in the decoder.

For example, if the synthesis window functions for the first three blocks in a frame is modified to achieve a desired frequency response corresponding to product window function $WP_1$ and the window function used for signal analysis is $WA_6$, then the required modified synthesis window functions are as follows:

$$WX1(n) = \begin{cases} 0 & \text{for } 0 \leq n < x \\ \dfrac{WP_1(n-x)}{WA_6(n)} & \text{for } x \leq n < \dfrac{N}{2} \\ WP_1(n-x)WA_6(n) & \text{for } \dfrac{N}{2} \leq n < N \end{cases} \quad (6a)$$

$$WX2(n) = \begin{cases} WP_1\left(n - x + \dfrac{N}{2}\right)WA_6(n) & \text{for } 0 \leq n < \dfrac{N}{2} + x \\ WA_6(n) & \text{for } \dfrac{N}{2} + x \leq n < N \end{cases} \quad (6b)$$

$$WX3(n) = \begin{cases} WP_1(n - x + N)WA_6(n) & \text{for } 0 \leq n < x \\ WA_6(n) & \text{for } x \leq n < N \end{cases} \quad (6c)$$

where $WX1(n)$ = modified synthesis window function for the first block, $WX2(n)$ = modified synthesis window function for the second block, $WX3(n)$ = modified synthesis window function for the third block, and $x$ = number of samples discarded at the frame boundary.

FIG. 10a illustrates, for several values of x, the shape of the modified synthesis window function required to convert a 256-point O-TDAC analysis-synthesis system using a KBD α=6 analysis window function into an analysis-synthesis system that has a frequency response equivalent to that of a system using KBD α=1 analysis and synthesis window functions with a frame overlap interval equal to 256 samples. Curves 361, 362, 363 and 364 are the modified synthesis window functions for x=8, 16, 24 and 32 samples, respectively.

The frequency responses of synthesis filterbanks using these modified window functions are shown in FIG. 10b. Curves 372, 373 and 374 are the frequency responses for x=8, 16 and 24 samples, respectively. Curve 371 is the frequency response of a synthesis filterbank using a KBD window function with α=1. As may be seen from this figure, a modified synthesis window function with x=16 attenuates frequencies above about 200 Hz to about the same extent as that achieved by a synthesis filterbank using KBD window functions with α=1. In other words, a synthesis filterbank that discards x=16 samples, when used in conjunction with an analysis filterbank and an α=6 analysis window function, is able to achieve an end-to-end analysis-synthesis system frequency response that is equivalent to the end-to-end frequency response of a system that uses α=1 analysis and synthesis window functions and, at the same time, provide a synthesis filterbank frequency response that attenuates frequencies above about 200 Hz nearly as much as a synthesis filterbank using an α=1 synthesis window function.

Systems which use KBD window functions with lower values of alpha for normal coding will generally require a smaller modification to the synthesis window function and fewer samples to be discarded at the end of the frame. The modified synthesis window functions required at the end of a frame are similar to the window functions shown in expressions 6a through 6c except with a time reversal.

Modulating the Frame Gain Profile

The second technique for modifying a synthesis window function avoids large increases in window function WX by allowing the frame gain profile to deviate slightly from the ideal level immediately on either side of a splice. By varying the deviation in the gain profile, the audibility of the deviation can be traded off against the audibility of spectral splatter.

This technique smoothes the modified synthesis window function so that it has small values at or near the frame boundary. When done properly, the resulting synthesis window function will have an acceptable frequency response and the frame gain profile will deviate from the ideal KBD product window function at or near the frame boundary where the gain is relatively low. The attenuation of spectral splatter will be degraded only slightly as compared to that provided by an ideal crossfade gain shape.

For example, if the synthesis window function for the first three blocks in a frame must be modified to achieve a desired frequency response, the modified synthesis window functions WX required for the second and third blocks are generally the same as shown above in expressions 6b and 6c, for x=0. The modified synthesis window function WX1 shown above in expression 6a is smoothed by multiplying it point-by-point with a smoothing window function over the first half of the smoothing window function's length. The resultant modified synthesis window function for the first block is:

$$WX1(n) = \begin{cases} \dfrac{WP_1(n)WM(n)}{WA_6(n)} & \text{for } 0 \le n < \dfrac{p}{2} \\ \dfrac{WP_1(n)}{WA_6(n)} & \text{for } \dfrac{p}{2} \le n < \dfrac{N}{2} \\ WP_1(n)WA_6(n) & \text{for } \dfrac{N}{2} \le n < N \end{cases} \quad (7)$$

where $WM(n)$ = the smoothing window function, and $p$ = length of the smoothing window function, assumed to be less than $N$.

The modified synthesis window function required at the end of a frame is identical to this window function except for a time reversal.

The smoothing window function WM may be based on essentially any window function; however, a KBD smoothing window function seems to work well. In this example, the smoothing window function is a KBD window function of length 128 with α=6. In FIG. 11a, curve 381 illustrates the shape of the modified synthesis window function without smoothing and curve 382 illustrates the shape of the modified synthesis window function with smoothing.

The frequency response for an analysis-synthesis system using the smoothed modified window function is shown in FIG. 11b. Curve 391 represents the frequency response that results from using the smoothed modified window function. Curve 341 represents the frequency response of an analysis-synthesis system using KBD window functions with α=1, and curve 393 represents an envelope of the peaks for the frequency response that results from using linearly-tapered frame crossfade window functions of about 5 msec. in duration, discussed above and illustrated as curve 343. As may be seen from this figure, a smoothed modified synthesis window function achieves a frequency response that is similar to the frequency response achieved by an analysis-synthesis system using KBD window functions with α=1.

Hybrid Analysis-Synthesis Window Function Modification

In the techniques discussed above, all changes to the frame gain profile are made in the signal synthesis process. As an alternative, the analysis process could use filterbanks with one frequency response for blocks at frame boundaries and use another filterbank for interior blocks. The filterbanks used for blocks at the frame boundaries could be designed to reduce the amount of modification required in the synthesis process to achieve a sufficient attenuation of spectral splatter at splices.

Data Synchronization

In applications that process both video and audio information, the video frame length generally is not equal to the audio block length. For the standards shown in Tables III and IV, video frames and audio blocks are rarely synchronized. Stated differently, an edit of video/audio information on a video frame boundary is probably not on an audio block boundary. As a result, in block coding systems, the audio information represented by the remaining partial block cannot be properly recovered. Two techniques that may be used to solve this problem are discussed below.

Audio Sample Rate Conversion

A first technique converts an input audio signal received at an external rate into another rate used in the internal processing of the coding system. The internal rate is chosen to provide a sufficient bandwidth for the internal signal and to allow a convenient number of samples to be grouped with each frame of video. At the time of decoding or playback, the output signal is converted from the internal rate to an external rate, which need not be equal to the external rate of the original input audio signal.

Table V shows for several video standards the video frame length, the number of audio samples at 48 k samples per second that equal the video frame length, the internal rate required to convert these audio samples into a target number of samples, and the internal audio frame length in samples, discussed below. The number shown in parenthesis for each video standard is the video frame rate in Hz. For video frame rates greater than 30 Hz, the target number of samples is 896. For video frame rates not greater than 30 Hz, the target number of samples is 1792. These target lengths are chosen for illustration, but they are convenient lengths for many coding applications because they can be divided into an integer number of 256-sample blocks that overlap one another by 128 samples.

TABLE V

Video and Audio Rates

| Video Standard | Frame Length (msec.) | Audio Length (samples) | Internal Rate (kHz) | Internal Audio Frame Length |
|---|---|---|---|---|
| DTV (60) | 16.667 | 800 | 53.76 | 1024 |
| NTSC (59.94) | 16.683 | 800.8 | 53.706 | 1024 |
| PAL (50) | 20 | 960 | 44.8 | 1024 |
| DTV (30) | 33.333 | 1600 | 53.76 | 1920 |
| NTSC (29.97) | 33.367 | 1601.6 | 53.706 | 1920 |
| PAL (25) | 40 | 1920 | 44.8 | 1920 |
| Film (24) | 41.667 | 2000 | 43 | 1920 |
| DTV (23.976) | 41.7 | 2002 | 42.965 | 1920 |

For example, an application that processes an input audio signal at 48 k samples per second and a PAL video signal at 25 frames per second could convert the input audio signal into an internal signal having a rate of 44.8 k samples per second. The internal signal samples may be arranged in internal audio frames for processing. In the example shown in Table V, the internal audio frame length is 1920 samples. In these examples, the internal audio frame length is not equal to the video frame length. This disparity is due to the number of samples by which the audio samples in one frame overlap the audio samples in another frame.

Referring to the example illustrated in FIG. 2c, each of the frames overlap one another by some number of samples. This number of samples constitutes the frame overlap interval. In many applications, the frame overlap interval is equal to the overlap interval between adjacent audio blocks within a respective frame. The number of samples that equal a video frame length are the number of samples that span the interval from the beginning of one frame to the beginning of the next frame. This is equal to the internal audio frame length less the number of samples in the frame overlap interval.

In the examples discussed above and shown in Table V, the number of samples that equal the video frame length is either 1792 or 896, depending on the video frame rate. The frame overlap interval is 128 samples. For video frame rates above 30 Hz, each internal audio frame includes 1024 (896+128) samples, which may be arranged into 7 blocks of 256 samples that overlap one another by 128 sample. For lower video frame rates, each internal audio frame includes 1920 (1792+128) samples, which may be arranged into 14 blocks of 256 samples that overlap one another by 128 samples.

If filterbanks are used which do not generate aliasing artifacts at frame boundaries, the frame overlap interval is preferably increased to 256 samples, which increases the internal frame length to 1152 (896+256) for video frame rates above 30 Hz and to 2048 (1792+256) for lower video frame rates.

The internal sample rate required to synchronize an audio signal with a desired video frame rate is equal to the product of that video frame rate and the number of samples that equal the video frame length. This is equivalent to $$R_I = R_V * (L_A - L_O) \quad (8)$$

where
$R_I$=internal sample rate,
$R_V$=video frame rate,
$L_A$=internal audio frame length, and
$L_O$=frame overlap interval.

FIG. 12a illustrates a functional block diagram of device 400 in which convert 403 receives an input audio signal having an external sample rate from path 402, converts the input audio signal into an internal signal having an internal sample rate, and passes the internal signal to encode 404. In response to the internal signal, encode 404 generates along path 405 an encoded signal arranged in internal audio frames. Format 406 receives video information arranged in frames from path 401 and assembles an internal audio frame with each video frame to generate an output signal along path 407.

FIG. 12b illustrates a functional block diagram of device 410 in which deformat 412 receives from path 411 an input signal arranged in frames comprising video information and encoded audio information. Deformat 412 obtains from the input signal video information that is passed along path 413, and obtains from the input signal encoded audio information arranged in internal audio frames that are passed along path 414. Decode 415 decodes the encoded audio information to generate an internal signal having an internal sample rate that is passed to convert 416. Convert 416 converts the internal signal into an output signal having an external sample rate.

Essentially any technique for sample rate conversion may be used. Various considerations and implementations for sample rate conversion are disclosed in Adams and Kwan, "Theory and VLSI Architectures for Asynchronous Sample Rate Converters," J. of Audio Engr. Soc., July 1993, vol. 41, no. 7/8, pp. 539–555.

Dynamic Audio Frame Alignment

If sample rate conversion is not used, the audio frame rate must vary with the video frame rate. The internal audio frame length may be set to a convenient length, say an integer multiple of a reasonably large power of two, to facilitate block processing such as split-band coding using transforms. The frame overlap interval is then set equal to the difference between the internal audio frame length and the number of samples that exactly span a video frame. This may be expressed as $$L_O = L_A - L_V \quad (9)$$

Unfortunately, as shown above in Table V, this technique is more complicated for those applications that process NTSC video because the audio sample rate is not an integer multiple of the video frame rate. As a result, the NTSC frame length is not equal to an integer number of audio samples; however, a specific number of video frames that do equal an integer number of audio samples can be grouped to form superframes. In other words, a product of the specific number and the audio sample rate is an integer multiple of the video frame rate event though the audio sample rate is not an integer multiple of the video frame rate. As shown in Table IV, five frames of NTSC video are required to synchronize with 8008 samples of audio at 48 k samples per second. In the examples discussed below, a group of five frames is referred to herein as a superframe.

The number of audio samples that corresponds with each video frame in a superframe is not constant but varies. Many arrangements are possible but a preferred arrangement for 29.97 Hz NTSC video is a sequence of five frames that correspond to 1602, 1601, 1602, 1601 and 1602 samples, respectively. For 59.94 Hz NTSC video, an analogous sequence may be used in which a pair of 801-sample blocks are substituted for each 1602 block and a 801/800-sample block pair is substituted for each 1601 block. The discussion below is directed toward a solution for applications that process 29.97 Hz video frames. These concepts may be applied to other video frame rates.

As shown in expression 9, a decoder must be able to determine the video frame length $L_V$ so that it can correctly determine the length of the overlap interval. If a decoder is confronted with a splice edit on a frame boundary, the frame following the splice may represent any one of five possible superframe alignments. Each complete superframe comprises a number of video frames that is equal to some number greater than one (in this NTSC example the number is five) but, because of splices, the decoder may encounter a partial superframe comprising a lesser number of frames. The decoder will not be able to recover the audio represented by the blocks following the splice unless they conform to the superframe alignment the decoder is using. This may be accomplished by the following dynamic audio frame alignment technique.

According to this technique, in device 420 as illustrated in FIG. 13a, encode 423 receives audio information from path 422 and generates encoded audio information arranged in superframes in which each frame is identified by a label that is unique for each frame in a respective superframe. The superframes of encoded audio information are passed along path 425, and the frame labels are passed along path 424. Format 426 receives frames of video information from path 421 and assembles this video information, the frames of encoded audio information and corresponding labels into an output signal that is passed along path 427.

In device 430, illustrated in FIG. 13b, deformat 432 receives an input signal from path 431, obtains frames of video information that are passed along path 433, obtains superframe sequences of encoded audio information that are passed along path 435, and obtains labels for each frame of encoded audio information that are passed along path 434. Process 436 determines a starting sample and frame length for each frame of encoded audio information in response to the label and decode 438 generates along path 439 an output signal by decoding the frames of encoded audio information according to the starting sample and frame length determined by process 436.

In a preferred embodiment, the frames in each superframe are labeled 0, 1, 2, 3 and 4. Each frame in a superframe is generated with the same structure, having an "early start sample," a "nominal start sample," and 1601 other samples for a total of 1603 samples. In the preferred embodiment, the samples are numbered from 0 to 1602, where the nominal start sample is sample number 1. Stated more generally, each frame in a superframe comprises an early start sample, a nominal start sample and a specific number of subsequent samples, where the specific number is the integer portion of a quotient equal to the audio sample rate divided by the video frame rate. In this example, the specific number is the integer portion of (48000/29.97), which is 1601. The nominal start sample in each frame is substantially aligned with a respective video frame. In the particular embodiment discussed here, the nominal start sample in frame 0 is assumed to be exactly synchronized with a respective video frame boundary of the video signal.

As discussed above, the internal audio frame length may be greater due to a frame overlap interval. One convenient internal audio frame length is 1792 samples. The frame gain profile is determined according to a video frame length of 1603. For the example just mentioned, the frame overlap interval is 189 (1792–1603) samples.

Device 430 assumes any desired superframe alignment and dynamically alters the alignment of each audio frame so that proper synchronization is achieved with the video information. The alignment is altered by dynamically selecting the starting sample and length for each frame. As described above and described below, the starting sample is selected from the early start sample, the nominal start sample and the sample following the nominal start sample, and the length is selected to vary between 1601 and 1602 samples according to the 5-frame pattern in a superframe. The effect of this dynamic alignment is to immediately achieve proper alignment following a splice that preserves synchronization with the accompanying video information.

In the preferred embodiment discussed here, the starting sample number and video frame length may be obtained from a table according to the following key:

$$K = (F_E - F_D) \text{ modulo } 5 \tag{10}$$

where

K=alignment table access key, $F_E$=encoder frame label, and $F_D$=decoder frame label.

The decoder obtains the encoder frame label from the encoded signal. The decoder frame label is generated by the decoder in a repeating sequence from 0 to 4 according to the superframe alignments assumed by the decoder.

The decoder obtains the proper frame starting sample number and video frame length from Table VI using K as an access key to the table.

TABLE VI

Dynamic Audio Frame Alignment

| Access Key | Encode Frame Label | Start Sample | Video Frame Length | Access Key | Encode Frame Label | Start Sample | Video Frame Length |
|---|---|---|---|---|---|---|---|
| 0 | 0 | 1 | 1602 | 1 | 0 | 1 | 1602 |
| 0 | 1 | 1 | 1601 | 1 | 1 | 1 | 1602 |
| 0 | 2 | 1 | 1602 | 1 | 2 | 2 | 1602 |
| 0 | 3 | 1 | 1601 | 1 | 3 | 1 | 1602 |
| 0 | 4 | 1 | 1602 | 1 | 4 | 2 | 1602 |
| 2 | 0 | 1 | 1601 | 3 | 0 | 1 | 1602 |
| 2 | 1 | 0 | 1601 | 3 | 1 | 1 | 1601 |
| 2 | 2 | 1 | 1602 | 3 | 2 | 1 | 1602 |
| 2 | 3 | 1 | 1601 | 3 | 3 | 1 | 1602 |
| 2 | 4 | 1 | 1602 | 3 | 4 | 2 | 1602 |
| 4 | 0 | 1 | 1601 | | | | |
| 4 | 1 | 0 | 1601 | | | | |
| 4 | 2 | 1 | 1601 | | | | |
| 4 | 3 | 0 | 1601 | | | | |
| 4 | 4 | 1 | 1602 | | | | |

An example of dynamic alignment is illustrated in FIG. 14. In this example, a superframe begins with frame 453 and is interrupted by a splice following frame 455. The last frame 456 in a superframe follows the splice, with a new superframe beginning with frame 457. The ideal length of the audio information in each frame is shown in the boxes of row 450. The encoder frame label $F_E$ for each frame generated by an encoder is shown in row 461. Note that label 0 corresponds to the first frame in each superframe. The decoder label $F_D$ assumed by the decoder, in this example, is shown in row 462. The difference between these two labels, calculated according to expression 10, determines the alignment table access key K which is shown in row 463. The starting and ending sample numbers, as determined from the alignment table, is shown in row 464. The notation 0–1601, for example, denotes a 1602-sample frame that starts at sample 0 and ends at sample 1601.

In frame 451, the decoder processes a block that is 1602 samples long. This frame is one sample longer than the "ideal" length according to the encoder superframe alignment. Accordingly, frame 452 starts one sample late and is one sample shorter than the ideal length. This results in frame 453 starting at sample number one, exactly synchronized with the first frame of the superframe. The alignment of frames 454 and 455 agree with the ideal alignment.

Immediately after the splice, the alignment of frame 456 agrees with the ideal alignment. Frame 457 starts at sample number one, exactly synchronized with the start of the next superframe. The length of frame 457 is one sample less than the ideal length, however, so frame 458 starts one sample early and has a length one sample greater than the ideal length. The start of frame 459 agrees with the ideal but it is one sample shorter than the ideal. Accordingly, frame 460 starts one sample earlier and is one sample longer than the ideal.

As this example shows, the decoder achieves exact synchronization with the start of each superframe regardless of the any discontinuities created by splices.

Device 430 uses a modified synthesis window function to achieve the proper end-to-end frame gain profile in a manner similar to that discussed above in connection with expressions 6a through 6c. The modified synthesis window function at the start of each frame is determined according to expression 6a where the number x of samples "discarded" at the frame boundary is equal to the frame starting alignment offset relative to the early start sample. For a frame starting at sample 2, for example, x=2. The modified synthesis window function at the end of each frame is also determined according to expression 6a except in a time-reversed manner.

What is claimed is:

1. A method for signal processing comprising:

receiving a first input signal comprising input samples representing audio information at an audio sample rate, receiving a second input signal comprising input frames conveying information at an input frame rate that are grouped in superframes, each superframe comprising a number of said input frames equal to a first number such that said audio sample rate divided by said input frame rate is not an integer but a product of said audio sample rate and said first number divided by said input frame rate is substantially equal to an integer, generating in response to said first input signal a sequence of audio frames, each audio frame corresponding to a respective input frame and comprising encoded audio information corresponding to a sequence of said input samples that includes an early start sample, a nominal start sample, and a number of subsequent samples equal to the integer portion of a quotient, said quotient equal to said audio sample rate divided by said input frame rate, wherein said early start sample is the first sample in said sequence of input samples and said nominal start sample is substantially aligned with said respective input frame, and generating an output signal arranged in output frames grouped into output superframes, each output superframe comprising a number of said output frames equal to said first number, a respective output frame comprising a respective audio frame and a label for said respective audio frame, wherein said label is unique for each audio frame in a respective output superframe.

2. A method according to claim 1 wherein said audio sample rate is 48 kHz, said input frame rate is substantially equal to 29.97 Hz, said first number is equal to five and said number of subsequent samples is 1601.

3. A method according to claim 1 wherein said audio sample rate is 48 kHz, said input frame rate is substantially equal to 59.94 Hz, said first number is equal to five and said number of subsequent samples is 800.

4. A method according to claim 1 wherein generation of said audio frames comprises applying a filterbank to said audio information.

5. A method for signal processing comprising:

receiving an input signal arranged in input frames grouped into complete and partial input superframes, each complete input superframe having a number of said input frames equal to a first number that is greater than one and each partial input superframe having a lesser number of said input frames, each input frame comprising an audio frame representing encoded audio information at an input frame rate and a label associated with said audio frame, wherein said label is unique for each audio frame in a respective complete or partial input superframe, deriving sequences of samples from said audio frames, wherein a respective sequence of samples is derived from a respective audio frame and comprises an early start sample, a nominal start sample, and a number of subsequent samples equal to a second number, wherein said sequence of samples represents audio information at an audio sample rate and said second number is equal to the integer portion of a quotient, said quotient equal to said audio sample rate divided by said input frame rate, obtaining from each sequence of samples a respective subsequence of samples, wherein, in response to the label associated with the audio frame from which a respective sequence of samples is derived, the corresponding subsequence comprises a third number of samples and starts at either the early start sample, the nominal start sample, or the sample following the nominal start sample, wherein said third number is equal to either the second number or one plus the second number, and generating an output signal from an arrangement of the subsequences in which the start of each subsequence and the start of the immediately preceding subsequence are separated by said third number of samples of said preceding subsequence.

6. A method according to claim 5 wherein said audio sample rate is 48 kHz, said input frame rate is substantially equal to 29.97 Hz, said first number is equal to five and said second number is equal to 1601.

7. A method according to claim 5 wherein said audio sample rate is 48 kHz, said input frame rate is substantially equal to 59.94 Hz, said first number is equal to five and said second number is equal to 800.

8. A method according to claim 5 wherein derivation of said respective sequence of samples comprises applying a synthesis filterbank to encoded audio information in said respective audio frame.

9. A device for signal processing comprising:

means for receiving a first input signal comprising input samples representing audio information at an audio sample rate, means for receiving a second input signal comprising input frames conveying information at an input frame rate that are grouped in superframes, each superframe comprising a number of said input frames equal to a first number such that said audio sample rate divided by said input frame rate is not an integer but a product of said audio sample rate and said first number divided by said input frame rate is substantially equal to an integer, means for generating in response to said first input signal a sequence of audio frames, each audio frame corresponding to a respective input frame and comprising encoded audio information corresponding to a sequence of said input samples that includes an early start sample, a nominal start sample, and a number of subsequent samples equal to the integer portion of a quotient, said quotient equal to said audio sample rate divided by said input frame rate, wherein said early start sample is the first sample in said sequence of input samples and said nominal start sample is substantially aligned with said respective input frame, and means for generating an output signal arranged in output frames grouped into output superframes, each output superframe comprising a number of said output frames equal to said first number, a respective output frame comprising a respective audio frame and a label for said respective audio frame, wherein said label is unique for each audio frame in a respective output superframe.

10. A device according to claim 9 wherein said audio sample rate is 48 kHz, said input frame rate is substantially equal to 29.97 Hz, said first number is equal to five and said number of subsequent samples is 1601.

11. A device according to claim 9 wherein said audio sample rate is 48 kHz, said input frame rate is substantially equal to 59.94 Hz, said first number is equal to five and said number of subsequent samples is 800.

12. A device according to claim 9 wherein generation of said audio frames comprises means for applying a filterbank to said audio information.

13. A device for signal processing comprising:

means for receiving an input signal arranged in input frames grouped into complete and partial input superframes, each complete input superframe having a number of said input frames equal to a first number that is greater than one and each partial input superframe having a lesser number of said input frames, each input frame comprising an audio frame representing encoded audio information at an input frame rate and a label associated with said audio frame, wherein said label is unique for each audio frame in a respective complete or partial input superframe, means for deriving sequences of samples from said audio frames, wherein a respective sequence of samples is derived from a respective audio frame and comprises an early start sample, a nominal start sample, and a number of subsequent samples equal to a second number, wherein said sequence of samples represents audio information at an audio sample rate and said second number is equal to the integer portion of a quotient, said quotient equal to said audio sample rate divided by said input frame rate, means for obtaining from each sequence of samples a respective subsequence of samples, wherein, in response to the label associated with the audio frame from which a respective sequence of samples is derived, the corresponding subsequence comprises a third number of samples and starts at either the early start sample, the nominal start sample, or the sample following the nominal start sample, wherein said third number is equal to either the second number or one plus the second number, and means for generating an output signal from an arrangement of the subsequences in which the start of each subsequence and the start of the immediately preceding subsequence are separated by said third number of samples of said preceding subsequence.

14. A device according to claim 13 wherein said audio sample rate is 48 kHz, said input frame rate is substantially equal to 29.97 Hz, said first number is equal to five and said second number is equal to 1601.

15. A device according to claim 13 wherein said audio sample rate is 48 kHz, said input frame rate is substantially equal to 59.94 Hz, said first number is equal to five and said second number is equal to 800.

16. A device according to claim 13 wherein said means for deriving sequences comprises means for applying a synthesis filterbank to encoded audio information in said respective audio frame.

* * * * *